(12) United States Patent
Xu et al.

(10) Patent No.: US 11,591,005 B2
(45) Date of Patent: Feb. 28, 2023

(54) TUNABLE DYNAMIC ABSORBER FOR ATTENUATING VIBRATION

(71) Applicant: VOLVO CONSTRUCTION EQUIPMENT AB, Eskilstuna (SE)

(72) Inventors: Hongan Xu, Mechanicsburg, PA (US); Marlin Zeis, Greencastle, PA (US); Michael Graham, Fayetteville, PA (US)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 445 days.

(21) Appl. No.: 16/767,513

(22) PCT Filed: Jan. 8, 2018

(86) PCT No.: PCT/US2018/012739
§ 371 (c)(1),
(2) Date: May 27, 2020

(87) PCT Pub. No.: WO2019/135768
PCT Pub. Date: Jul. 11, 2019

(65) Prior Publication Data
US 2020/0331524 A1    Oct. 22, 2020

(51) Int. Cl.
*B62D 7/22* (2006.01)
*B62D 1/19* (2006.01)
*B62D 1/11* (2006.01)

(52) U.S. Cl.
CPC ............. *B62D 1/195* (2013.01); *B62D 7/222* (2013.01); *B60G 2202/25* (2013.01); *B62D 1/11* (2013.01);
(Continued)

(58) Field of Classification Search
CPC .... B62D 7/222; B62D 1/195; B60G 2202/25; F16F 2228/04; F16F 2228/066
See application file for complete search history.

(56) References Cited

U.S. PATENT DOCUMENTS 3,657,967 A    4/1972  Suzuki
4,352,304 A   10/1982  Warner
(Continued)

FOREIGN PATENT DOCUMENTS

DE    102004001137 A1    8/2005
DE    102009020658 A1    3/2010
(Continued)

OTHER PUBLICATIONS

International Search Report and Written Opinion of the International Searching Authority, PCT/US2018/012739, dated Mar. 6, 2018, 6 pages.
(Continued)

*Primary Examiner* — James A English
(74) *Attorney, Agent, or Firm* — Sage Patent Group

(57) ABSTRACT

A dynamic vibration absorber for reducing steering wheel vibration. The vibration absorber includes a resilient member that includes a resilient member inner surface that defines a center cavity that is configured to receive a steering column of a vehicle that generates vibration that is transferred to a steering wheel via the steering column, the center cavity being substantially coaxial with the steering column when attached thereto. The resilient member includes at least one resilient member outer surface that defines a resilient member outer diameter. The vibration absorber includes a rigid body that engages and is supported by the resilient member and that includes six degrees of freedom of movement relative to the steering column, the rigid body including a rigid body inner surface that defines a rigid body center cavity.

28 Claims, 20 Drawing Sheets

(52) U.S. Cl.
CPC ..... *F16F 2228/04* (2013.01); *F16F 2228/066* (2013.01)

(56) References Cited

U.S. PATENT DOCUMENTS

| | | | |
|---|---|---|---|
| 5,902,186 | A | 5/1999 | Gaukel |
| 6,283,867 | B1 | 9/2001 | Aota et al. |
| 7,096,993 | B2 | 8/2006 | Roll |
| 7,490,855 | B2 | 2/2009 | Inayoshi et al. |
| 8,556,292 | B2 * | 10/2013 | Umemura .............. B62D 7/222 280/731 |
| 10,150,441 | B2 * | 12/2018 | Sella ................... B60R 21/2037 |
| 10,315,605 | B2 * | 6/2019 | Ishii ................... B60R 21/2037 |
| 2002/0142850 | A1 | 10/2002 | Garcia et al. |
| 2005/0017493 | A1 | 1/2005 | Goto et al. |
| 2006/0278030 | A1 | 12/2006 | Tavel et al. |
| 2011/0287846 | A1 | 11/2011 | Drechsler et al. |
| 2013/0026741 | A1 * | 1/2013 | Onohara ............. B60R 21/2037 74/552 |
| 2013/0221641 | A1 | 8/2013 | Kondo et al. |

FOREIGN PATENT DOCUMENTS

| | | | |
|---|---|---|---|
| JP | 2001-030921 A | | 2/2001 |
| JP | 2004216952 A | * | 8/2004 |
| JP | 2006327422 A | | 12/2006 |

OTHER PUBLICATIONS

Extended European Search Report, European Patent Application No. 18897997.5, dated Jul. 16, 2021, 7 pages.

Chinese First Office Action dated Sep. 22, 2022, for Chinese Patent Application No. 201880085695.4, 19 pages (including English translation).

* cited by examiner

TUNABLE DYNAMIC ABSORBER FOR ATTENUATING VIBRATION

CROSS REFERENCE TO RELATED APPLICATIONS

This application is a 35 U.S.C. § 371 national stage application of PCT International Application No. PCT/US2018/012739 filed on Jan. 8, 2018, the disclosure and content of which is incorporated by reference herein in its entirety.

TECHNICAL FIELD

The present disclosure relates to the field of machines, and more particularly, to machines that are subject to steering wheel vibration and related assemblies.

BACKGROUND

A variety of machines are subject to significant steering wheel vibration during operation. Examples of such machines include asphalt and soil compactors. Some machines may use vibration to enhance compaction. For example, a surface compactor having a cylindrical drum may cause the drum to vibrate to enhance compaction of a substrate. Since vibration may be controlled via the operator and may be turned off and on continually throughout a normal work shift, limiting operator vibration exposure may be an important when operating such machines. For example, some standards may provide that hand vibration may be limited to 2.5 m/s2. As mentioned, vibration is a common/key component of compaction. Thus, finding ways to limit operator exposure to vibration may be desirable.

Vibration may be transferred to an operator through the steering wheel. Equipment designers have tried various techniques for reducing vibration at the steering wheel. However, with increased focus on machine performance, a target vibration threshold may be difficult to achieve with conventional approaches. For example, one approach includes redesigning the pedestal of the steering column. Results of such approaches have been insufficient, particularly given the cost of such implementations. Additionally, each machine has its own vibration signature, which may require a unique solution for each type of machine.

SUMMARY

According to one embodiment, a dynamic vibration absorber for reducing steering wheel vibration includes a resilient member that includes a resilient member inner surface that defines a center cavity that is configured to receive a steering column of a vehicle that generates vibration that is transferred to a steering wheel via the steering column. The center cavity is substantially coaxial with the steering column when attached thereto. The resilient member includes at least one resilient member outer surface that defines a resilient member outer diameter. A rigid body engages and is supported by the resilient member and includes at least six degrees of freedom of movement relative to the steering column. The rigid body includes a rigid body inner surface that defines a rigid body center cavity that contains the resilient member.

According to an embodiment, the resilient member is selected from multiple resilient member types corresponding to a first tuning factor, the rigid body is selected from multiple rigid body types corresponding to a second tuning factor. The first tuning factor includes at least one of a target vibration frequency, a target vibration direction, and a mass quantity of a steering column and/or a steering wheel and the second tuning factor includes at least one of the target vibration frequency, the target vibration direction, and the mass quantity of a steering column and/or a steering wheel.

According to an embodiment, a dynamic vibration absorber for reducing steering wheel vibration is provided. The dynamic vibration absorber includes a resilient member that includes a resilient member inner surface that defines a center cavity that is configured to receive a portion of a steering column that is adjacent the steering wheel of a vehicle. The center cavity is substantially coaxial with the steering column when attached thereto. The resilient member includes at least one resilient member outer surface that defines a resilient member outer diameter. A rigid body that engages and is supported by the resilient member includes a rigid body inner surface that defines a rigid body center cavity that contains the resilient member.

ASPECTS

According to one aspect, a dynamic vibration absorber for reducing steering wheel vibration is provided. The dynamic vibration absorber for reducing steering wheel vibration includes a resilient member that includes a resilient member inner surface that defines a center cavity that is configured to receive a steering column of a vehicle that generates vibration that is transferred to a steering wheel via the steering column. The center cavity is substantially coaxial with the steering column when attached thereto. The resilient member includes at least one resilient member outer surface that defines a resilient member outer diameter. A rigid body engages and is supported by the resilient member and includes at least six degrees of freedom of movement relative to the steering column. The rigid body includes a rigid body inner surface that defines a rigid body center cavity that contains the resilient member.

In one aspect, the at least six degrees of freedom comprise a forward aft linear direction, a forward aft torsional direction, a longitudinal linear direction, a longitudinal torsional direction, a lateral linear direction and a lateral torsional direction.

In one aspect, the dynamic vibration absorber is configured to absorb vibration frequency components in the forward aft linear direction in a range from about 110 Hz to about 118 Hz, the dynamic vibration absorber is configured to absorb vibration frequency components in the forward aft torsional direction in a range from about 55 Hz to about 61 Hz, the dynamic vibration absorber is configured to absorb vibration frequency components in the longitudinal linear direction in a range from about 53 Hz to about 58 Hz, the dynamic vibration absorber is configured to absorb vibration frequency components in the longitudinal torsional direction in a range from about 54 Hz to about 59 Hz, the dynamic vibration absorber is configured to absorb vibration frequency components in the lateral linear direction in a range from about 110 Hz to about 118 Hz, and the dynamic vibration absorber is configured to absorb vibration frequency components in the lateral torsional direction in a range from about 55 Hz to about 61 Hz.

In one aspect, the resilient member outer surface that defines the resilient member outer diameter includes multiple first resilient member outer surface portions that are circumferentially spaced apart from one another. The resilient member further includes multiple second resilient member outer surface portions that are between adjacent ones of the first resilient member outer surface portions and that each define one of a plurality of cavities between adjacent ones of the plurality of first resilient member outer surface portions and the rigid body inner surface.

One aspect provides that a size of ones of the cavities corresponds to a target vibration frequency component that the dynamic vibration absorber is tuned to absorb.

In one aspect, the rigid body includes at least two split sleeves that include fastener components that are configured to couple the at least two split sleeves to one another around the steering column. In one aspect the resilient member includes at least two resilient member components that are configured to be installed together around the steering column. Responsive to being installed together, the at least two resilient member components define the resilient member inner surface and the at least one resilient member outer surface.

In one aspect, a diameter of the resilient member inner surface that defines a center cavity that is configured to receive the steering column is substantially a same as an outer diameter of the steering column.

In one aspect, the at least one resilient member outside surface engages a portion of the rigid body inner surface.

In one aspect, the steering column includes a proximal end that is attached to the vehicle and a distal end that is opposite the proximal end and is configured to support the steering wheel and the resilient member inner surface is configured to engage an outer surface of the steering column and/or the steering wheel.

In one aspect, the resilient member includes a first thickness that corresponds to a target vibration frequency component that the dynamic vibration absorber is tuned to absorb.

In one aspect, the resilient member includes a first resilient member including a first resilient member inner surface that defines the center cavity that is configured to receive the steering column. The rigid body includes a first rigid body that engages and is supported by the first resilient member. The resilient member further includes a second resilient member that includes a second resilient member inner surface that defines a center cavity that is configured to receive the first rigid body and engage a first rigid body outer surface. The rigid body further includes a second rigid body that engages and is supported by the second resilient member.

In one aspect, each of the first rigid body and the second rigid body include at least six degrees of freedom of movement relative to the steering column. In one aspect, each of the first resilient member, the second resilient member, the first rigid body and the second rigid body are substantially coaxial with one another.

In one aspect, each of the first rigid body and the second rigid body includes at least two split sleeves that include fastener components that are configured to couple the at least two split sleeves to one another around the steering column. In one aspect, the first resilient member and the second resilient member each includes at least two resilient member components that are configured to be installed together around the steering column. Responsive to being installed together, the at least two resilient member components define the respective first resilient member inner surface and second resilient member inner surface.

In one aspect, the dynamic vibration absorber is configured to absorb first vibration frequency components corresponding to the first rigid body and the first resilient member and second vibration frequency components corresponding to the second rigid body and the second resilient member.

In one aspect, the first rigid body includes a first rigid body portion and a second rigid body portion. The first rigid body portion includes a first quantity of mass and the second rigid body portion is separate from the first rigid body portion and includes a second quantity of mass that is different from the first quantity of mass. The first rigid body portion and a second rigid body portion engage and are supported by the resilient member. The first rigid body portion is configured to reduce vibration of the steering column corresponding to a first frequency and the second rigid body portion is configured to address vibration corresponding to a second frequency that is different from the first frequency.

In one aspect, the second rigid body includes an outer second rigid body portion that is at a first radial distance from an axis of the steering column, an inner second rigid body portion that is at a second radial distance from the axis of the steering column that is different from the first radial distance, and a cantilever portion that is between the outer second rigid body portion and the inner second rigid body portion and that is connected to each of the outer second rigid body portion and the inner second rigid body portion.

In one aspect, the first rigid body includes an inner first rigid body portion that is at a first radial distance from an axis of the steering column and that is formed to extend angularly around the axis of the steering column at less than 360 degrees and an outer first rigid body portion that extends radially from the first rigid body portion at a given angular position on the inner first rigid body portion and in a direction that is away from the axis of the steering column.

In one aspect, the rigid body includes a cylindrical housing that includes a cavity therein that receives and engages the resilient member. The cylindrical housing includes a first cylindrical housing portion that is a portion of a cylinder and a second cylindrical housing portion, wherein a cylinder is formed when the first cylindrical housing portion and the second cylindrical housing portion are coupled together. A joining component is configured to engage the first and second cylindrical housing portions to attach the first cylindrical housing portion to the second cylindrical housing portion.

In one aspect, the resilient member is selected from multiple resilient member types corresponding to a first tuning factor and the rigid body is selected from multiple rigid body types corresponding to a second tuning factor. The first tuning factor includes at least one of a target vibration frequency, a target vibration direction, and a mass quantity of a steering column and/or a steering wheel and the second tuning factor includes at least one of the target vibration frequency, the target vibration direction, and the mass quantity of a steering column and/or a steering wheel.

In one aspect, an effective frequency range of vibration damping in the longitudinal linear direction is a range from about 53 Hz to about 61 Hz and includes combined degrees of freedom components corresponding to the longitudinal linear direction, the forward aft torsional direction and the lateral torsional direction.

In one aspect, a primary frequency range of vibration damping in the forward aft linear direction is a range from about 54 Hz to about 61 Hz and includes combined degrees of freedom components corresponding to the longitudinal torsional direction and the lateral torsional direction and a harmonic frequency range of vibration damping in the forward aft linear direction is a range of about 110 Hz to about 118 Hz.

In one aspect, a primary frequency range of vibration damping in the lateral linear direction is a range from about 54 Hz to about 61 Hz and includes combined degrees of freedom components corresponding to the forward aft torsional direction and the longitudinal torsional direction and a harmonic frequency range of vibration damping in the lateral linear direction is a range of about 110 Hz to about 118 Hz.

In one aspect, the resilient member outer surface that defines the resilient member outer diameter includes multiple first resilient member outer surface portions that are circumferentially spaced apart from one another. The resilient member further includes multiple second resilient member outer surface portions that are between adjacent ones of the first resilient member outer surface portions and that each define one of multiple cavities between adjacent ones of the first resilient member outer surface portions and the rigid body inner surface.

In one aspect, a volume of ones of the cavities is in a range of about five percent to about ten percent of a total volume of the resilient member.

In one aspect, the center cavity of the resilient member includes a resilient member inner diameter and a ratio of the resilient member outer diameter to the resilient member inner diameter is in a range of about 1.5 to about 1.6.

In one aspect, the rigid body includes a rigid body outer diameter and the center cavity of the resilient member includes a resilient member inner diameter. A ratio of the rigid body outer diameter to the resilient member inner diameter may be in a range of about 2.0 to about 2.1 times a mass ratio corresponding to the rigid body.

In one aspect, the rigid body includes a rigid body length measured in a steering column center axis direction and the resilient member includes a resilient member length measured in the steering column axis direction. A ratio of the resilient member length to the rigid body length may be in a range of about 0.85 to about 0.95.

In one aspect, the rigid body includes a rigid body length measured in a steering column center axis direction and the center cavity of the resilient member includes a resilient member inner diameter. A ratio of the rigid body length to the resilient member inner diameter may be in a range of about 1.0 to about 1.2 times a mass ratio of the rigid member.

In one aspect, ones of the first resilient member outer surface portions include a thickness in a direction that is measured orthogonally relative to a steering column center axis direction and the center cavity of the resilient member includes a resilient member inner diameter. A ratio of the thickness to the resilient member inner diameter may be in a range of about 0.3 to about 0.35.

According to one aspect, a dynamic vibration absorber for reducing steering wheel vibration is provided. The dynamic vibration absorber includes a resilient member that includes a resilient member inner surface that defines a center cavity that is configured to receive a portion of a steering column that is adjacent the steering wheel of a vehicle. The center cavity is substantially coaxial with the steering column when attached thereto. The resilient member includes at least one resilient member outer surface that defines a resilient member outer diameter. A rigid body that engages and is supported by the resilient member includes a rigid body inner surface that defines a rigid body center cavity that contains the resilient member.

Other dynamic vibration absorbers, rigid bodies, and resilient members according to aspects or embodiments will be or become apparent to those with skill in the art upon review of the following drawings and detailed description. It is intended that all such additional dynamic vibration absorbers, rigid bodies, and resilient members be included within this description and protected by the accompanying claims. Moreover, it is intended that all aspects and embodiments disclosed herein can be implemented separately or combined in any way and/or combination.

BRIEF DESCRIPTION OF THE DRAWINGS

The accompanying drawings, which are included to provide a further understanding of the disclosure and are incorporated in a constitute a part of this application, illustrate certain non-limiting embodiments. In the drawings.

DETAILED DESCRIPTION

Embodiments will now be described more fully hereinafter with reference to the accompanying drawings, in which examples of embodiments are shown. Embodiments be in many different forms and should not be construed as limited to the embodiments set forth herein. Rather, these embodiments are provided so that this disclosure will be thorough and complete, and will fully convey the scope of present disclosure to those skilled in the art. It should also be noted that these embodiments are not mutually exclusive. Components from one embodiment may be tacitly assumed to be present/used in another embodiment. Any two or more embodiments described below may be combined in any way with each other. Moreover, certain details of the described embodiments may be modified, omitted, or expanded upon without departing from the scope of the described subject matter.

Figure 1:
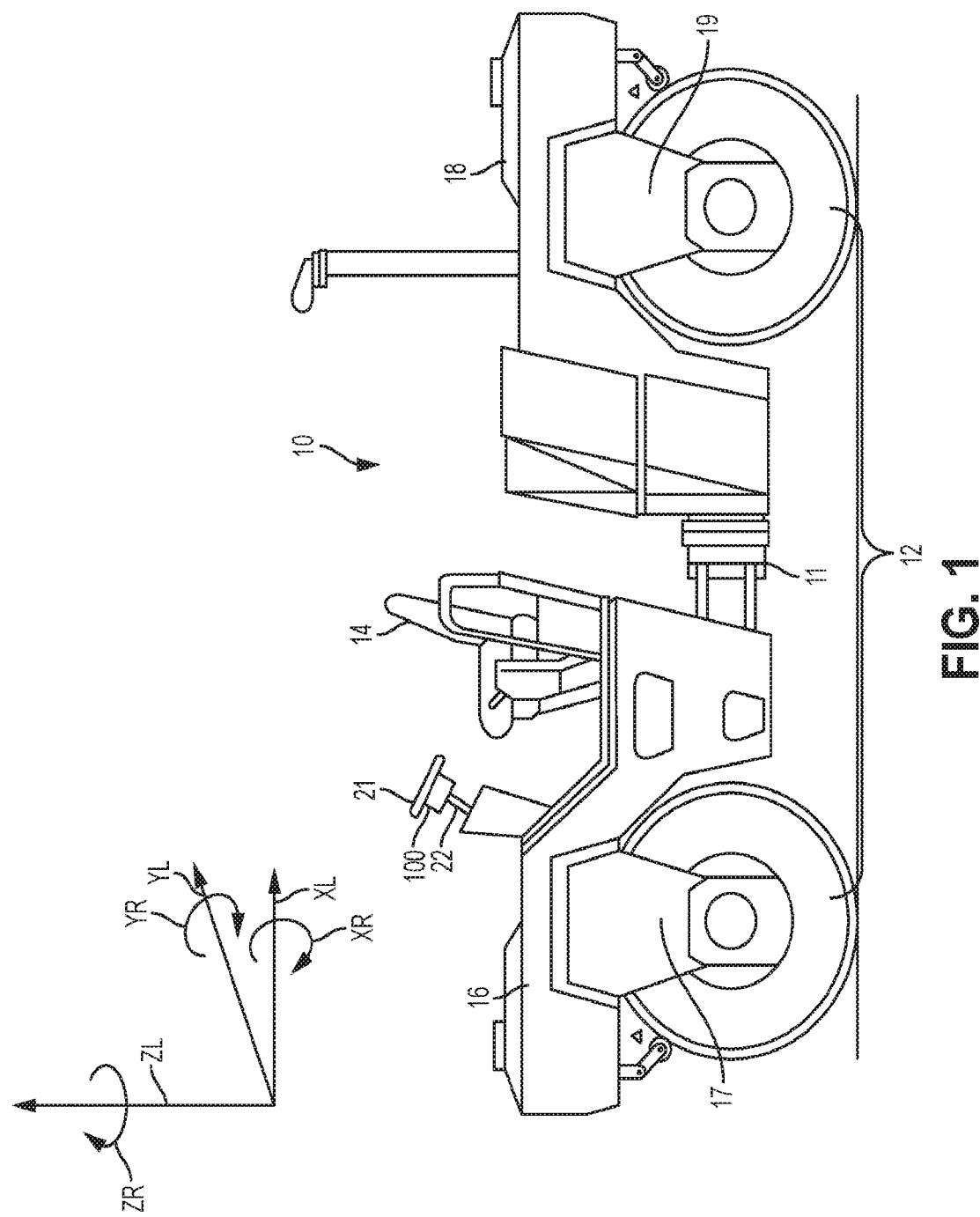
FIG. 1 is a side view of a compaction machine according to some embodiments.

FIG. 1 illustrates a self-propelled roller-type surface compactor machine 10 according to some embodiments. The surface compactor machine 10 can include a chassis 16, 18, rotatable drums 12 at the front and back at of the chassis, and a driver station including a seat 14 and a steering mechanism 15 (e.g., a steering wheel) to provide driver control of the compaction machine. Moreover, each drum may be coupled to the chassis 16, 18 using a respective yoke 17, 19. One or both of the drums 12 may be driven by a drive motor in the chassis under control of the driver to propel the surface compactor machine 10. An articulable coupling 11 may be provided in the chassis to facilitate steering about a vertical axis. The drums 12 have a cylindrical outer surface that forms a compacting surface for compacting an underlying substrate, such as asphalt, gravel, soil, etc. One or both of the drums 12 may generate vibration forces that assist with compaction of the substrate. The surface compactor machine 10 includes a steering wheel 21 or similar device for receiving operator input to control the direction of travel of the surface compactor machine 10. The steering wheel 21 may be coupled to the surface compactor machine 10 via a steering column 22. The steering column 22 includes a proximal end that is coupled to the surface compaction machine 10 and a distal end that is opposite the proximal end and that is coupled to the steering wheel 21.

The surface compactor machine 10 may generate significant vibration in general and such vibration may be transmitted to the steering wheel 21 via the steering column 22. In this regard, during normal use and operation, the operator may experience undesirably high levels of vibration through the steering wheel 21. To that end, the surface compaction machine includes a tunable dynamic vibration absorber ("TDA"). As shown, a TDA 100 may be attached to the steering column 22 at or near the distal end thereof and/or to the steering wheel 21.

Embodiments disclosed herein are directed to a tunable dynamic vibration absorber ("TDA") that is tunable to use across one or more machine platforms that include multiple machine types and/or configurations. In use and operation, the TDA 100 may significantly reduce the hand vibration that is experienced by an operator down to acceptable levels and thus the operator's comfort may be immensely improved. Vibration may generally be expressed as the acceleration of a vibrating component, which is a measure of how quickly the velocity of the component is changing. Acceleration may be measured and expressed as magnitudes corresponding to different axes. For example, the X, Y and Z axes in a Cartesian coordinate system may be used to provide 3 orthogonal axes along which to measure the vibration. In measuring the vibration, accelerometers corresponding to each of the X, Y, and Z axes may be used. Although the X, Y, and Z axes are illustrated as generally corresponding to the surface compactor machine 10, such arrangement is substantially arbitrary as the X, Y, and Z axes could be oriented to correspond any other components, such as, for example, the steering column 22.

In the context of using the same or similar steering column arrangements across multiple product lines, any type of structural modifications thereto may be cost prohibitive to implement. The TDA 100 may provide a robust and/or cost effective solution to the problem of hand vibration reduction for an entire class of vehicles and/or machinery. In some embodiments, the TDA 100 may be a detachable device that is tunable to different vibration frequencies corresponding to different machines.

A TDA 100 as disclosed herein may be applied and/or attached to the steering column and/or the steering wheel of a machine in a manner that does not affect the soundness of the structure or interfere with the operator in any tangible way. For example, when installed on an asphalt compactor, a location which potentially satisfies these requirements may be physically located near the "free" end of the steering column (the other end is mounted onto floor).

The TDA 100 includes a seismic mass component and a resilient member that may attach the mass component to a vibrating source to be suppressed. By selecting the stiffness of the resilient element and the arrangement and quantity of the suspended mass, the TDA may be able to absorb vibratory energy at a targeted frequency and/or frequency range or band. Additionally, arrangement and/or design of the resilient member may be used to target selected vibration frequencies and/or frequency components. In this manner, the seismic mass may attenuate vibrations with different selected frequency components. The seismic mass component engages and is supported by the resilient element and includes six degrees of freedom of movement relative to the steering column. The six degrees of freedom of movement include a Z longitudinal ZL, Z rotational ZR (roll), Y lateral YL, Y rotational YR (pitch), X for-after XL, and X rotational XR, which may correspond to X, Y and Z axes in a Cartesian coordinate system.

By providing the six degrees of freedom of movement relative to the steering column, the seismic mass component may be able to attenuate the vibrations along all axes, however defined.

Various embodiments of the TDA 100 are described herein by way of non-limiting examples in the context of the roller-type surface compactor machine 10. It is to be understood that the embodiments are not limited to the particular configurations disclosed herein and may furthermore be used with other types of machines that generate and/or translate vibration to an operator via a steering column and/or steering wheel. The figures are not necessarily provided to scale, but instead, dimensions may be exaggerated to better illustrate embodiments including elements of the TDA 100.

Figure 2A:
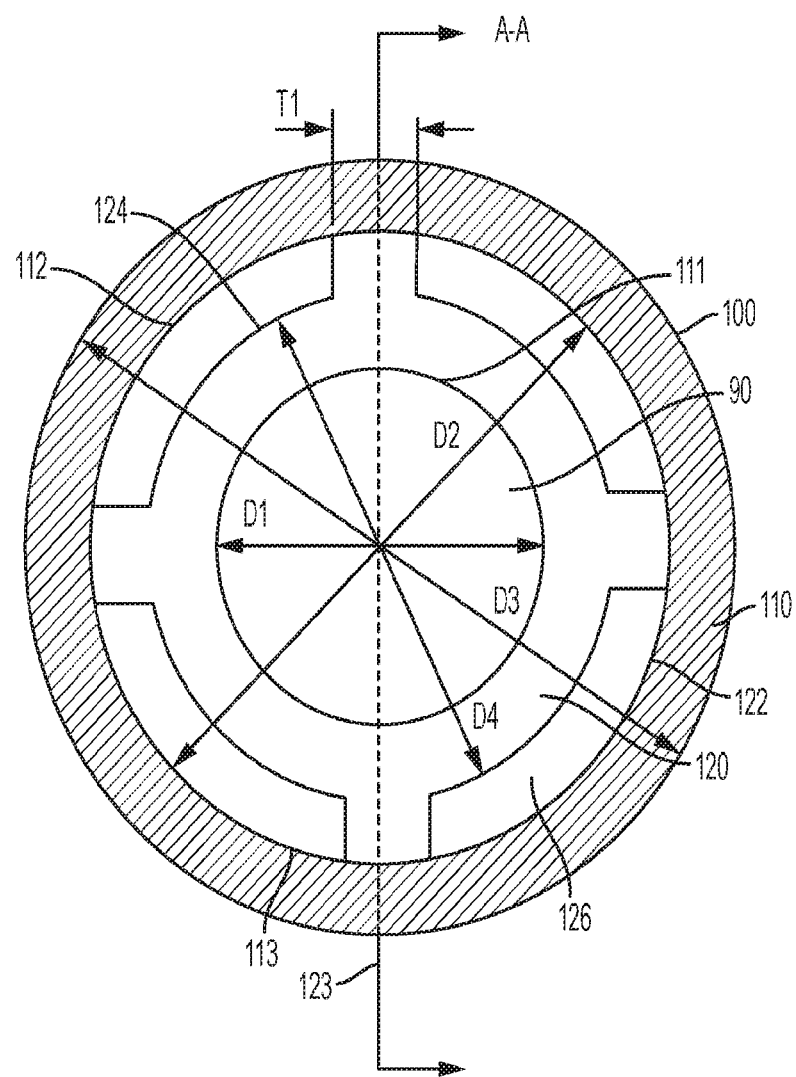
FIG. 2A is a top schematic view of a tunable dynamic vibration absorber according to some embodiments.
Figure 2B:
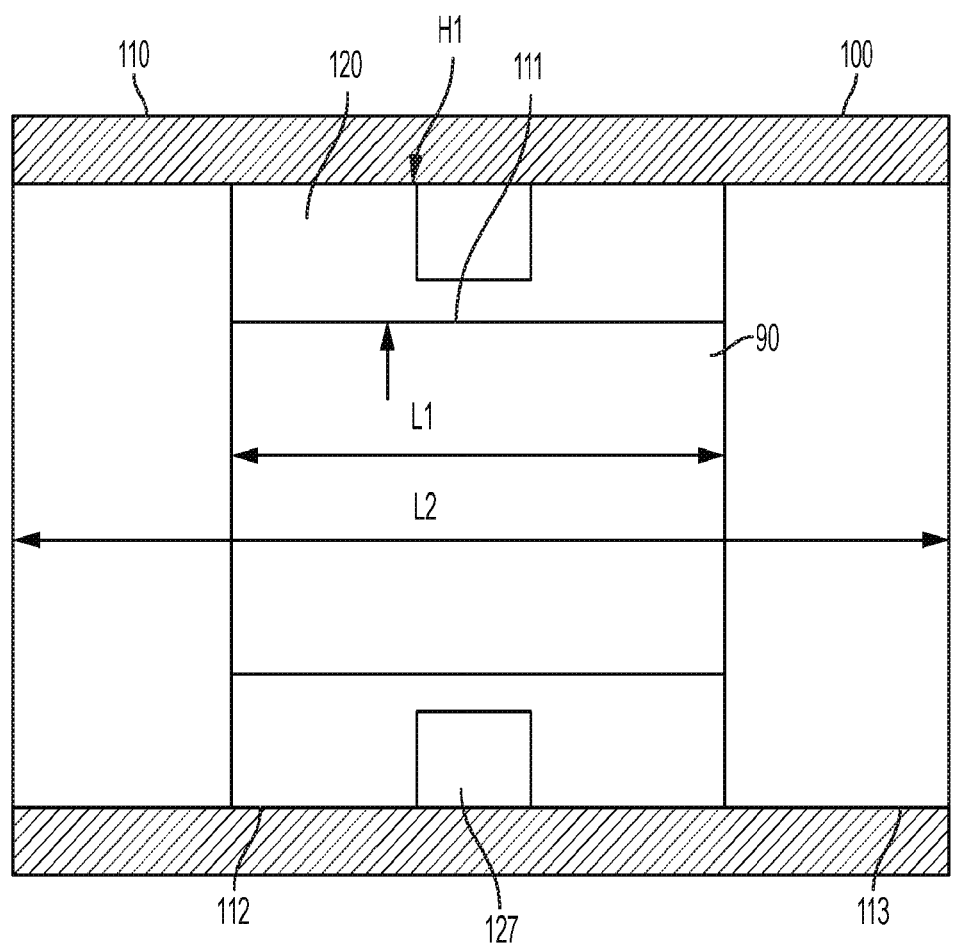
FIG. 2B is a cross-sectional schematic view taken along Line A-A of FIG. 2A.

Reference is now made to FIGS. 2A and 2B, which are a top schematic view of a TDA according to some embodiments and a cross-sectional schematic view taken along line A-A, respectively. The TDA 100 includes a resilient member 120 that includes a resilient member inner surface 111 that defines a center cavity 90 that is configured to receive a steering column 22 of a vehicle that generates vibration that is transferred to a steering wheel via the steering column 22. The center cavity 90 may be substantially coaxial with the steering column 22 when the attached thereto. The resilient member inner surface 111 includes a diameter D1 that may be substantially the same or slightly less than an outer diameter of the steering column 22. The resilient member 120 includes at least one resilient member outer surface 112 that defines a resilient member outer diameter D2. The resilient member 120 includes one or more elastic materials such as neoprene and/or natural rubbers, among other elastomers.

The steering column 22 includes a proximal end that is attached to the vehicle and a distal end that is opposite the proximal end and is configured to support the steering wheel 21. The resilient member inner surface 111 is configured to engage an outer surface of the distal end of the steering column 22 and/or the steering wheel 21. For example, the resilient member inner surface 11 may engage the outer surface of the distal end of the steering column 22 within a range of less than about 6 inches from the end of the steering column 22. Some embodiments provide that the resilient member inner surface 11 engages the outer surface of the end of the distal end of the steering column within a range of less than about 10 inches from the end of the steering column 22.

The TDA 100 include a rigid body 110 that engages and is supported by the resilient member 120. The rigid body 110 may include metallic and/or non-metallic materials that provide significant mass quantity within a given volume. For example, the rigid body 110 may include iron, steel, aluminum, titanium, polymers and/or combinations and/or alloys thereof. The rigid body 110 may include a rigid body inner surface 113 that defines a rigid body center cavity that may have a rigid body inner diameter D2 and that may have an axial length L2. The rigid body inner diameter D2 may be substantially the same as the resilient member outer diameter. The rigid body 110 may be referred to as a seismic mass in that inertia of the rigid body deforms the resilient member during acceleration. By virtue of the six degrees of freedom, the TDA may be considered as a collection of six independent dynamic vibration absorbers, thus may provide simultaneous suppression of multi-directional vibrations.

By virtue of engagement with the steering column 22 through the resilient member 120, the rigid body 110 is allowed to move relative to the steering column 22 to attenuate vibrations with different frequency components. The shape of the resilient member 120 may be varied to tune the TDA 100 to dominant target frequencies. For example, the effective stiffness of a given elastomer may be varied by adjusting the resilient member thickness T1, height H1 and length L1 and creating cavities 126 and 127. In this manner, vibrations of a steering column 22 in multiple directions may be targeted for absorption by the TDA 100.

According to one aspect of the present embodiments, symmetrical arrangement of the TDA 100 may allow a decoupling of individual vibration absorbing elements so that the vibrations in different directions can be targeted separately. For instance, the vibrations at a point on the surface of the steering column 22 may have two independent vibration components with different amplitudes in any two perpendicular translational directions. A symmetric configuration may be able to suppress these vibrations simultaneously. Similarly, the TDA 100 may be tuned to reduce the rotational vibrations of the steering column 22 at the same offending frequency as the translational vibration.

According to one aspect of the present embodiment, the resilient member outer surface 122 that defines the resilient member outer diameter may include multiple first resilient member outer surface portions 123 that are circumferentially spaced apart from one another. According to another aspect of the present embodiment, the resilient member 120 may include multiple second resilient member outer surface portions 124 that are between adjacent ones of the first resilient member outer surface portions 123 and that define one or more first cavities 126 between adjacent ones of the first resilient member outer surface portions 123 and the rigid body inner surface 112. Within the scope of the present embodiment, the size of ones of the first cavities 126 may correspond to a target vibration frequency component that the TDA 100 is tuned to absorb. Furthermore, the one or more first cavities 126 may be substantially the same size as one another or may be different sizes relative to one another.

As illustrated the first resilient member outer surface portions 123 are circumferentially spaced apart from one another. Some embodiments provide that the second resilient member outer surface portions 124 are between adjacent ones of the first resilient member outer surface portions 123 and that each defines one of first cavities 126 between adjacent ones of the first resilient member outer surface portions 123, and the rigid body inner surface 112. According to one aspect of an embodiment, the second resilient member outer surface portions 124 may have a second resilient member outer surface diameter D4.

Referring to FIG. 2B, second cavities 127 may be formed in the resilient member 120. Some embodiments provide that the cavity volume (Vc) of each of the second cavities 127 may be in a range of about five percent to about ten percent of a total volume (Vt) of the resilient member 120.

According to one aspect of the present embodiment, the values and/or relative values of the cavity volume Vc and the total volume Vt of the resilient member may be selected to target vibrational frequencies in the X, Y and Z directions. For example, using the ratio ranges above, the values of the cavity volume Vc and the total volume Vt of the resilient member may be selected to target vibrational frequencies from 54 to 61 Hz in the X direction, vibrational frequencies from 54 to 61 Hz in the Y direction and vibrational frequencies from 53 to 61 Hz in the Z direction.

Referring back to FIG. 2A, according to one aspect of an embodiment, the TDA 100 may target specific vibrational frequencies by selecting relative diameters of the resilient member 120. According to one aspect of the present embodiment, the center cavity 90 of the resilient member 120 includes a resilient member inner diameter D1 and the resilient member outer surface portions 123 include a resilient member outer diameter D2 such that a ratio of the resilient member outer diameter D2 to the resilient member inner diameter D1 is in a range of about 1.5 to about 1.6. According to another aspect of the present embodiment, the ratio of the resilient member outer diameter D2 to the resilient member inner diameter D1 is in a range that includes values that are less than 1.5 or greater than 1.6.

According to one aspect of the present embodiment, the values and/or relative values of the resilient member inner diameter D1 and the resilient member outer diameter D2 may be selected to target vibrational frequencies in the X direction and the Y direction. For example, using the ratio ranges above, the values of the resilient member inner diameter D1 and the resilient member outer diameter D2 may be selected to target vibrational frequencies from 54 to 61 Hz and 110 to 118 Hz in the X direction and/or vibrational frequencies from 54 to 61 Hz and 110 to 118 Hz in the Y direction.

According to one aspect of an embodiment, the TDA 100 may target specific vibrational frequencies by selecting relative diameters of the resilient member 120. According to one aspect of the present embodiment, the resilient member 120 includes a second resilient member outer surface diameter D4 and a resilient inner diameter D1 (FIG. 2A) and a ratio of the second resilient member outer surface diameter D4 to the resilient member inner diameter D1 is in a range of about 1.2 to about 1.35.

According to one aspect of the present embodiment, the values and/or relative values of the second resilient member outer surface diameter D4 and the resilient inner diameter D1 may be selected to target vibrational frequencies in the X direction and the Y direction. For example, using the ratio ranges above, the values of the second resilient member outer surface diameter D4 and the resilient inner diameter D1 may be selected to target vibrational frequencies from 54 to 61 Hz and 110 to 118 Hz in the X direction and/or vibrational frequencies from 54 to 61 Hz and 110 to 118 Hz in the Y direction.

According to one aspect of an embodiment, the TDA 100 may target specific vibrational frequencies by selecting relative diameters of the rigid body 110 and the resilient member 120. According to one aspect of the present embodiment, the rigid body 110 includes a rigid body outer diameter D3 (FIG. 2A) and a ratio of the rigid body outer diameter D3 to the resilient member inner diameter D1 is in a range of about 2.0 to about 2.1 times a mass ratio corresponding to the rigid body. The mass ratio may be determined as the square root of the density of steel divided by the density of the material used in the rigid body 110. According to one aspect of the present embodiment, the mass ratio may be determined as the square root of the density of steel divided by the density of the material used in the rigid body 110. According to one aspect of the present embodiment, the ratio of the rigid body outer diameter D3 to the resilient member inner diameter D1 is in a range that includes values that are less than 2.0 times the mass ratio or greater than 2.1 times the mass ratio corresponding to the rigid body 110. According to yet another aspect of the present embodiment, the ratio of the rigid body outer diameter D3 to the resilient member inner diameter D1 is in a range that includes values that are less than 2.0 times the mass ratio or greater than 2.1 times the mass ratio corresponding to the rigid body 110.

According to one aspect of the present embodiment, the values and/or relative values of the rigid body outer diameter D3 and the resilient member inner diameter D1 may be selected to target vibrational frequencies in the X direction and the Y direction. For example, using the ratio ranges above, the values of the rigid body outer diameter D3 and the resilient member inner diameter D1 may be selected to target vibrational frequencies from 54 to 61 Hz and 110 to 118 Hz in the X direction and/or vibrational frequencies from 54 to 61 Hz and 110 to 118 Hz in the Y direction.

Referring again to FIG. 2B, according to one aspect of an embodiment, the TDA 100 may target specific vibrational frequencies by selecting relative body lengths of the rigid body 110 and the resilient member 120. The rigid body 110 includes a rigid body length L2 measured in a steering column center axis direction and the resilient member 120 includes a resilient member length L1 measured in the steering column axis direction. According to one aspect of the present embodiment, a ratio of the resilient member length L1 to the rigid body length L2 is in a range of about 0.85 to about 0.95. According to another aspect of the present embodiment, the ratio of the resilient member length L1 to the rigid body length L2 is in a range that includes values that are less than 0.85 or greater than 0.95.

According to one aspect of the present embodiment, the values and/or relative values of the resilient member length L1 and the rigid body length L2 may be selected to target vibrational frequencies in the Z direction. For example, using the ratio ranges above, the values of the resilient member length L1 and the rigid body length L2 may be selected to target vibrational frequencies from 53 to 61 Hz in the Z direction.

According to one aspect of an embodiment, the TDA 100 may target specific vibrational frequencies by selecting relationships between the rigid body length L2 and the resilient member inner diameter D1, as a function of the mass ratio. According to one aspect of the present embodiment, a ratio of the rigid body length L2 to the resilient member inner diameter D1 is a range of about 1.0 to about 1.2 times the mass ratio of the rigid member 110. According to another aspect of the present embodiment, the ratio of the rigid body length L2 to the resilient member inner diameter D1 is in a range that includes values that are less than 1.0 or greater than 1.2 times the mass ratio of the rigid body 110.

According to one aspect of the present embodiment, the values and/or relative values of the rigid body length L2 and the resilient member inner diameter D1 may be selected to target vibrational frequencies in the Z direction. For example, using the ratio ranges above, the values of the rigid body length L2 and the resilient member inner diameter D1 may be selected to target vibrational frequencies from 53 to 61 Hz in the Z direction.

According to one aspect of an embodiment, the TDA 100 may target specific vibrational frequencies by selecting relationships between thicknesses and diameters of the resilient member 120. The first resilient member outer surface portions 123 include a thickness T1 in a direction that is measured orthogonally relative to a steering column center axis direction. According to one aspect of the present embodiment, a ratio of the thickness T1 to the resilient member inner diameter D1 is in a range of about 0.3 to about 0.35. According to another aspect of the present embodiment, the ratio of the thickness T1 to the resilient member inner diameter D1 is in a range that includes values that are less than 0.3 or greater than 0.35.

According to one aspect of the present embodiment, the values and/or relative values of the thickness T1 and the resilient member inner diameter D1 may be selected to target vibrational frequencies in the X, Y and Z directions. For example, using the ratio ranges above, the values of the thickness T1 and the resilient member inner diameter D1 may be selected to target vibrational frequencies from 54 to 61 Hz and 110 to 118 Hz in the X direction, vibrational frequencies from 54 to 61 Hz and 110 to 118 Hz in the Y direction and vibrational frequencies from 53 to 61 Hz in the Z direction.

As provided above, the TDA 100 may target specific vibrational frequencies in the Z direction by selecting values of the resilient member length L1, the rigid body length L2, the thickness T1, the rigid body outer diameter D3, and the second resilient member outer surface diameter D4. The TDA 100 may target specific vibrational frequencies in the X and Y directions by selecting values of the thickness T1, resilient member outer diameter D2, the rigid body outer diameter D3, and the second resilient member outer surface diameter D4.

Figure 13A:
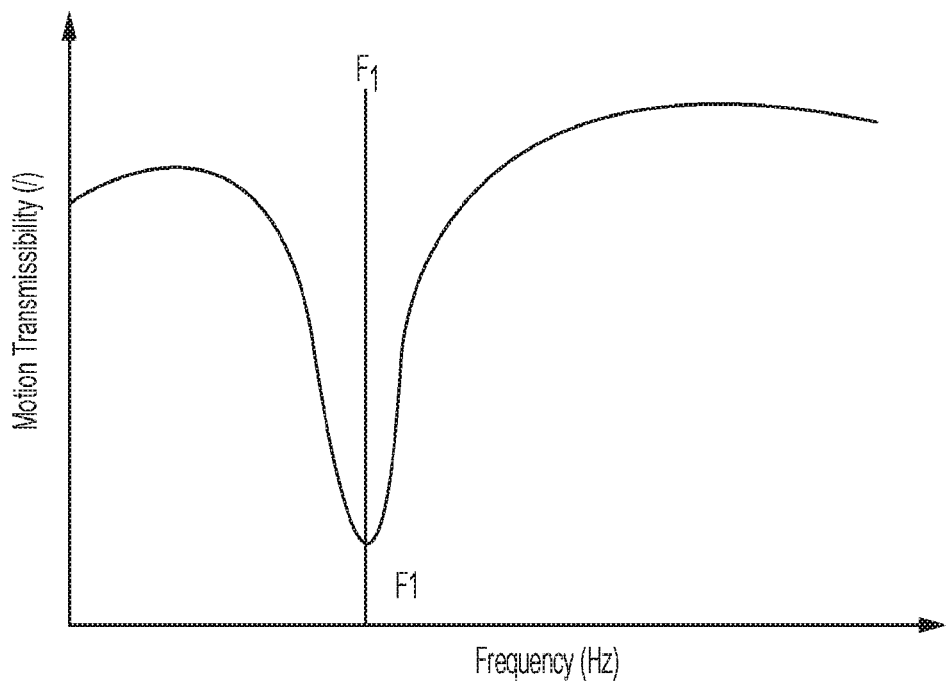
FIGS. 13A and 13B are plots of vibration amplitudes versus frequency illustrating performance of a vibration absorber and a one mass, one resilient element tunable dynamic vibration absorber according to some embodiments, respectively.
Figure 13B:
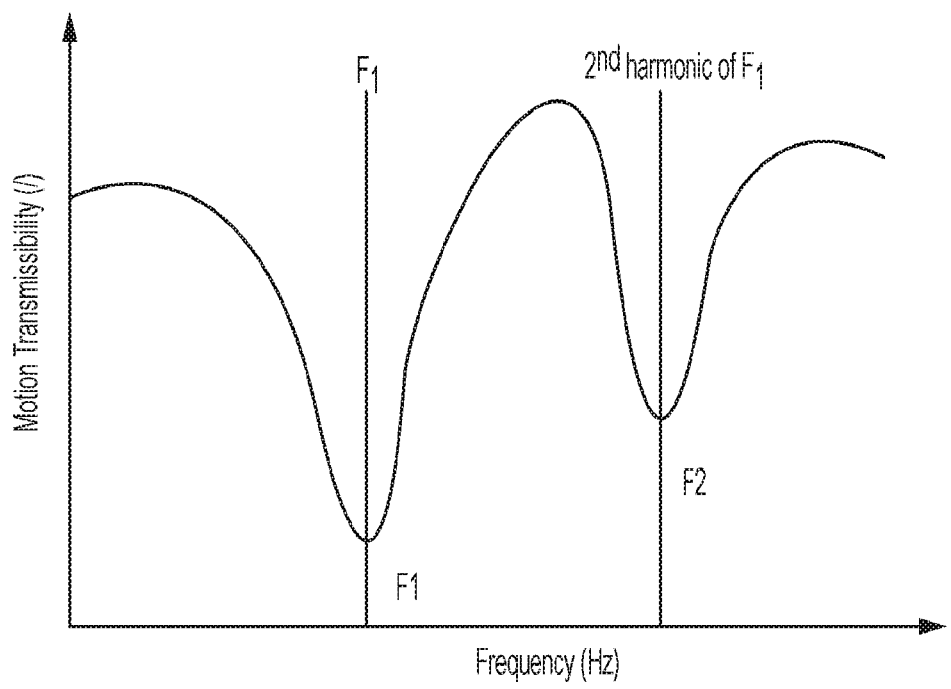

Brief reference is now made to FIGS. 13A and 13B, which are plots of vibration amplitudes versus frequency illustrating performance of a vibration absorber and a one mass, one resilient element tunable dynamic vibration absorber as discussed above regarding FIGS. 2A and 2B, respectively. As illustrated in FIG. 13A, vibration in a vibration absorber may be reduced in the primary frequency band F1, which may correspond to a rotational speed of an eccentric mass.

Referring to FIG. 13B, using a one mass, one resilient element tunable dynamic vibration absorber, vibrations in two different frequency bands can be reduced simultaneously. For example, a first frequency band F1 may correspond to a rotational speed of an eccentric mass and a second frequency band F2 may correspond to a higher frequency harmonic of the first frequency band. For example, in the plot of FIG. 13B, the second frequency band F2 corresponds to the $2^{nd}$ order harmonic of the target frequency band F1, which is also suppressed.

Figure 12:
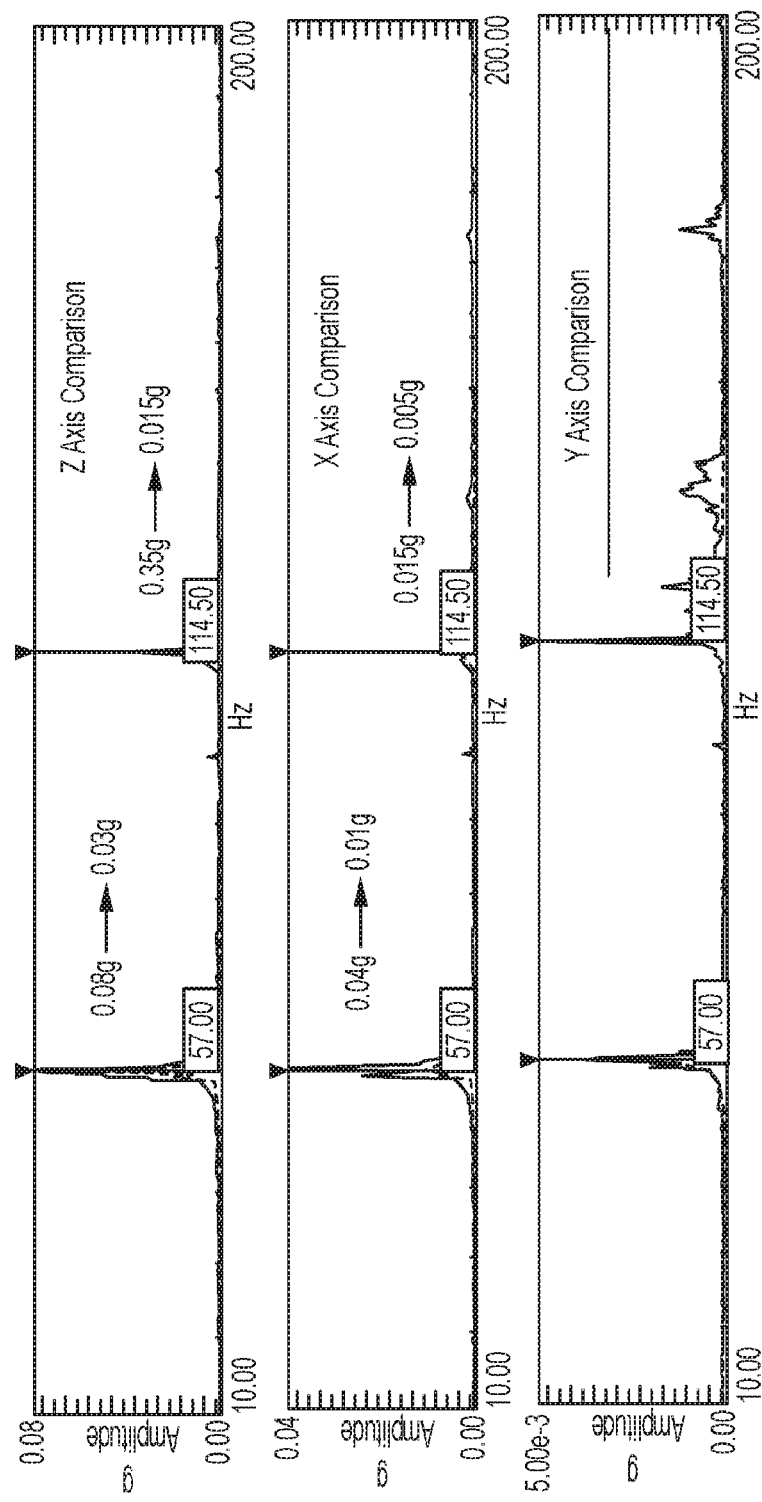
FIG. 12 is three plots illustrating vibration absorption corresponding to the Z, X and Y axes, respectively, according to some embodiments.

Brief reference is now made to FIG. 12, which is three plot of vibration absorption corresponding to the Z, X and Y axes, respectively, according to some embodiments as described above. As illustrated, the experimental data demonstrates a reduction in the vibration acceleration along the Z-axis from 0.08 g to about 0.03 g at about 57.0 Hz and from 0.035 g to about 0.015 g at about 114.5 Hz. Additionally, a reduction in the vibration acceleration along the Y-axis from 0.01 g to about 0.002 g may occur at about 114.5 Hz, which is the second harmonic of the primary frequency along that axis. Similarly, the experimental data demonstrates a reduction in the vibration acceleration along the X-axis from 0.04 g to about 0.01 g at about 57.0 Hz and from 0.015 g to about 0.005 g at about 114.5 Hz.

Figure 3:
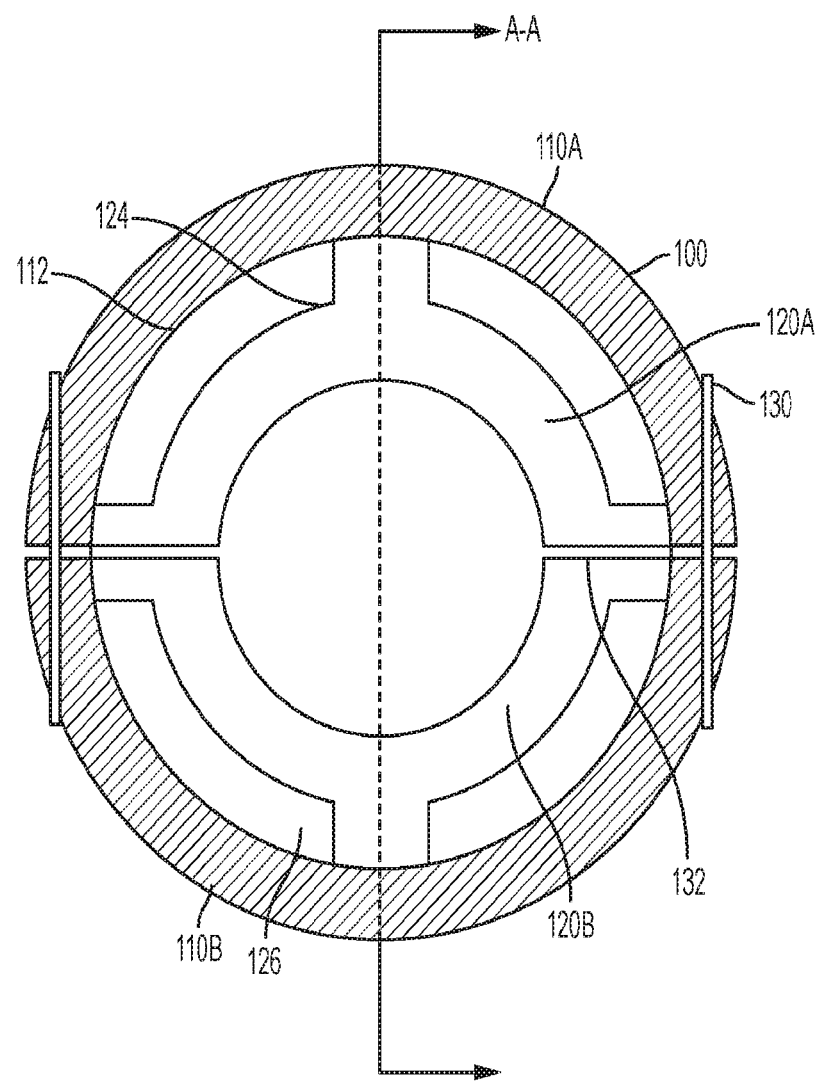
FIG. 3 is a top schematic view of a tunable dynamic vibration absorber according to some embodiments.

Reference is now made to FIG. 3, which is a top schematic view of a TDA according to some embodiments. Many of the features of an embodiment according to FIG. 3 have been discussed above regarding FIGS. 2A and 2B. As such, the discussion thereof will be omitted for brevity. Unlike conventional approaches in which dampers may be welded to the rotating shaft, the TDA 100 may include two or more pieces that are connected to one another via fasteners, such as screws, bolts, nuts, threaded fasteners, rivets, deformation fasteners, compression fasteners, and/or chemical bonding agents and/or adhesives, among others. The two or more pieces, when connected together around the steering column 22 and/or steering wheel 21 portion, may be securely fastened thereto. For example, the two or more pieces may provide that the rigid body 100 includes at least two split sleeves 110A, 110B that include fastener components 130 that are configured to couple the at least two split sleeves 110A, 110B to one another around the steering column 22. According to one aspect of the present embodiment, the fastener components 130 may be arranged to enhance the performance of the rigid body 100. For example, in an aspect according to one embodiments, the fastener components 130 may be arranged opposite one another on the TDA 100 to provide symmetry corresponding to specific degrees of freedom.

The resilient member 120 may include at least two resilient member components 120a, 120B that are configured to be installed together around the steering column 22. The resilient member components 120A, 120B include mating surfaces 132 that are configured to engage one another when the split sleeves 110A, 110B are fastened around the steering column 22.

Figure 4A:
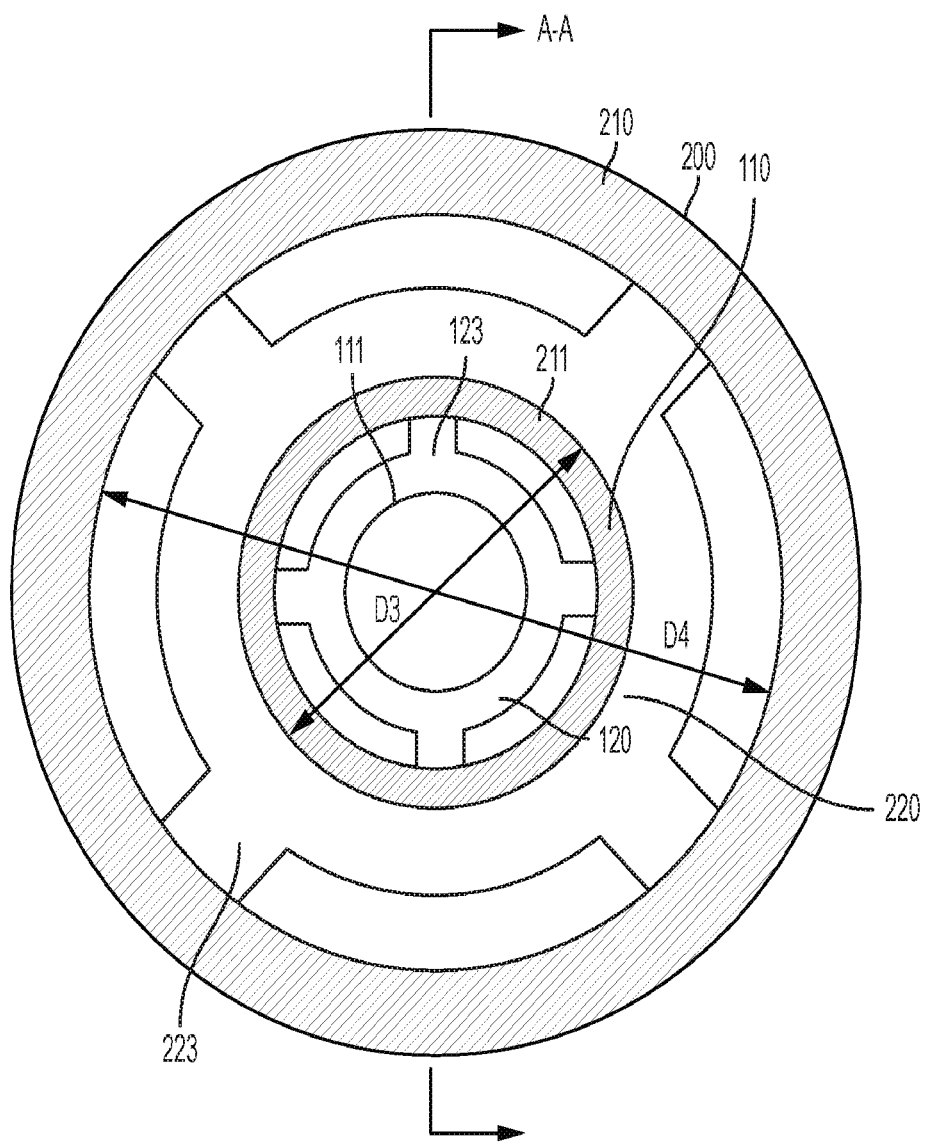
FIG. 4A is a top schematic view of a tunable dynamic vibration absorber according to some embodiments.
Figure 4B:
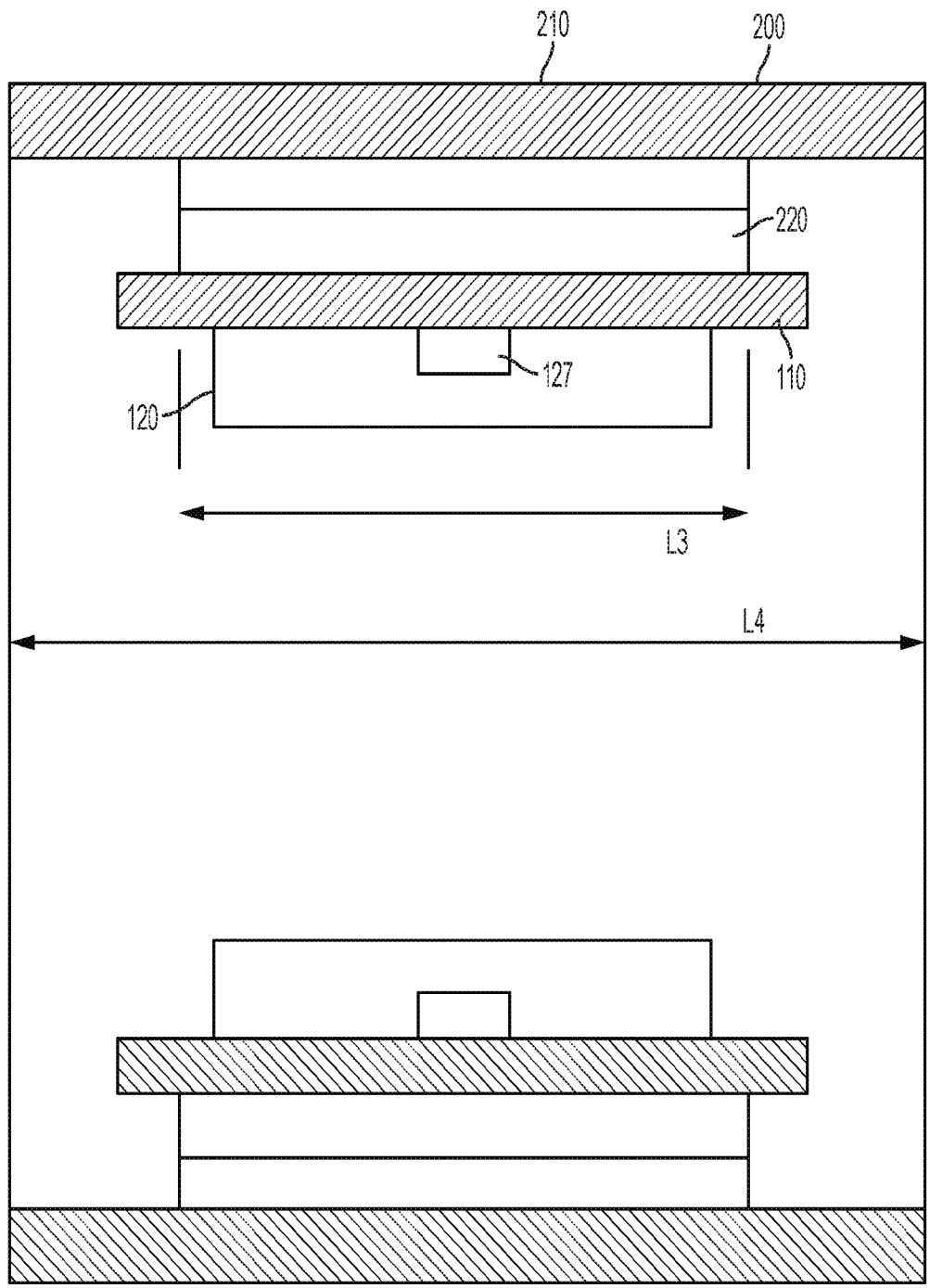
FIG. 4B is a cross-sectional schematic view taken along Line A-A of FIG. 4A.

Reference is now made to FIGS. 4A and 4B, which are a top schematic view of a TDA according to some embodiments and a cross-sectional schematic view taken along Line A-A, respectively. Many of the features of an embodiment according to FIGS. 4A and 4B have been discussed above regarding FIGS. 2A and 2B. As such, the discussion thereof will be omitted for brevity. As illustrated in FIGS. 4A and 4B, a TDA 200 may include another layer of resilient material and another seismic mass, which may improve vibration absorption performance.

The TDA 200 may include a first resilient member 120 including a first resilient member inner surface 111 that defines the center cavity that is configured to receive the steering column 22. A first rigid body 110 engages and is supported by the first resilient member 120. A second resilient member 220 that includes a second resilient member inner surface 211 that defines a center cavity that is configured to receive the first rigid body 110 and engage the outer surface of the first rigid body. A second rigid body 210 engages and is supported by the second resilient member 220. Each of the first resilient member 120, the second resilient member 220, the first rigid body 110 and the second rigid body 210 are substantially coaxial with one another.

Figure 14A:
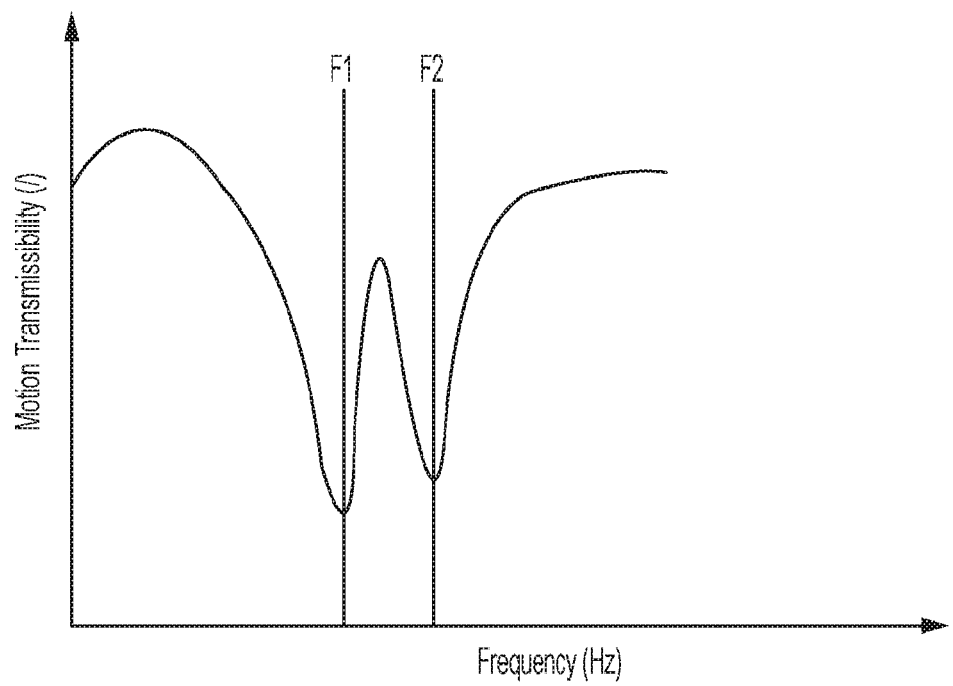
FIGS. 14A and 14B are plots of vibration amplitudes versus frequency illustrating performance of a vibration absorber and a two mass, two resilient element tunable dynamic vibration absorber according to some embodiments, respectively.
Figure 14B:
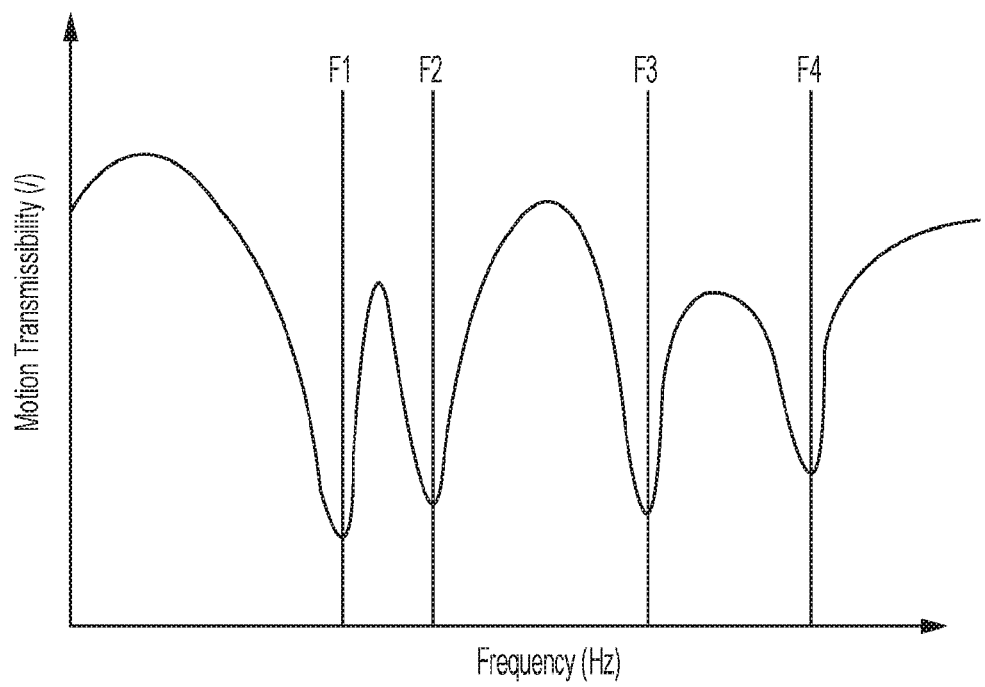

Brief reference is now made to FIGS. 14A and 14B, which are plots of vibration amplitudes versus frequency illustrating performance of a vibration absorber and a two mass, two resilient element tunable dynamic vibration absorber as discussed above regarding FIGS. 4A and 4B, respectively. As illustrated in FIG. 14A, vibration in a vibration absorber may be reduced in two of primary frequency bands F1 and F2, which may correspond to rotational speeds of one or more eccentric masses.

Referring to FIG. 14B, using a two mass, two resilient element tunable dynamic vibration absorber, vibrations in two different frequency bands can be reduced simultaneously. For example, a first frequency band F1 and the second frequency band F2 may correspond to rotational speeds of two eccentric masses. The third frequency band F3 may correspond to a higher frequency harmonic of the first frequency band F1. Similarly, the fourth frequency band F4 may correspond to a higher frequency harmonic of the second frequency band F2. As provided in the plot of FIG. 14B, the third and fourth frequency bands F3 and F4 correspond to the $2^{nd}$ order harmonics of the first and second target frequency bands F1 and F2, which are also suppressed.

The engagement between the second rigid body 210 and the second resilient member 220 may be similar to that discussed above regarding FIGS. 2A and 2B and thus will be omitted for brevity. The first rigid body 110 and the second rigid body 210 each include at least six degrees of freedom of movement relative to the steering column 22. Additionally, the second rigid body 210 has six degrees of freedom of movement relative to the first rigid body 110. The second resilient member 220 may include a length L3 that is different from the length of the first resilient member 120 (L2, FIG. 2B). The second rigid body 210 may include a length L4 that is different from the length of the first rigid body 120 (L1, FIG. 2B). As such, the TDA 200 may provide a two-stage vibration system with quadruple anti-resonant frequencies.

According to one aspect of an embodiment, the TDA 200 may target specific vibrational frequencies corresponding to the directions of the six degrees of freedom of movement. In one aspect of the present embodiment, the first resilient member outer surface portions 123 may be angularly offset from the second resilient member outer surface portions 223. In one aspect of the present embodiment, the alignment between the first and second resilient member outer surface portions 123, 223 may be adjusted to provide additional tuning functionality. For example, one aspect of the present embodiment provides that the first resilient member outer surface portions 123 are substantially centered between adjacent ones of the second resilient member outer surface portions 223. One aspect of the present embodiment provides that the first resilient member outer surface portions 123 are not centered between adjacent ones of the second resilient member outer surface portions 223.

Figure 5A:
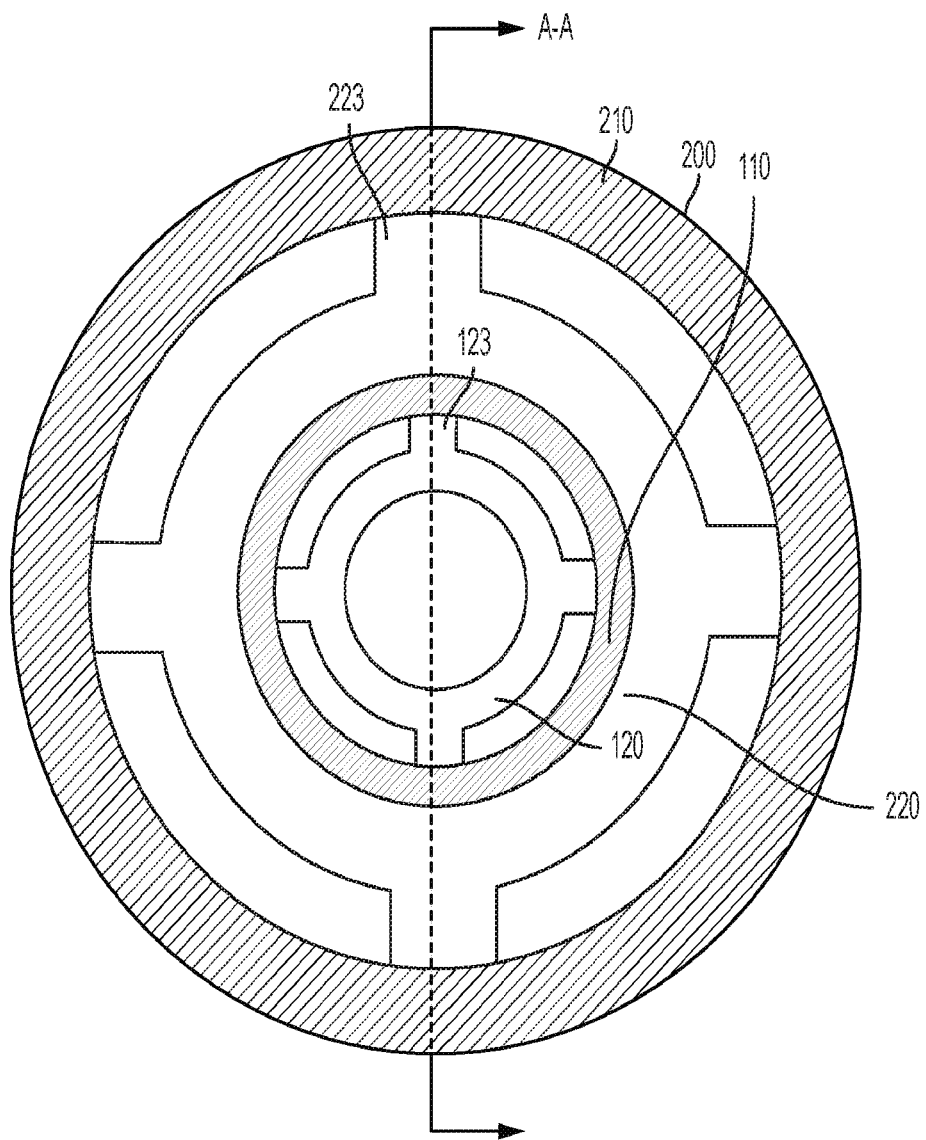
FIG. 5A is a top schematic view of a tunable dynamic vibration absorber according to some embodiments.
Figure 5B:
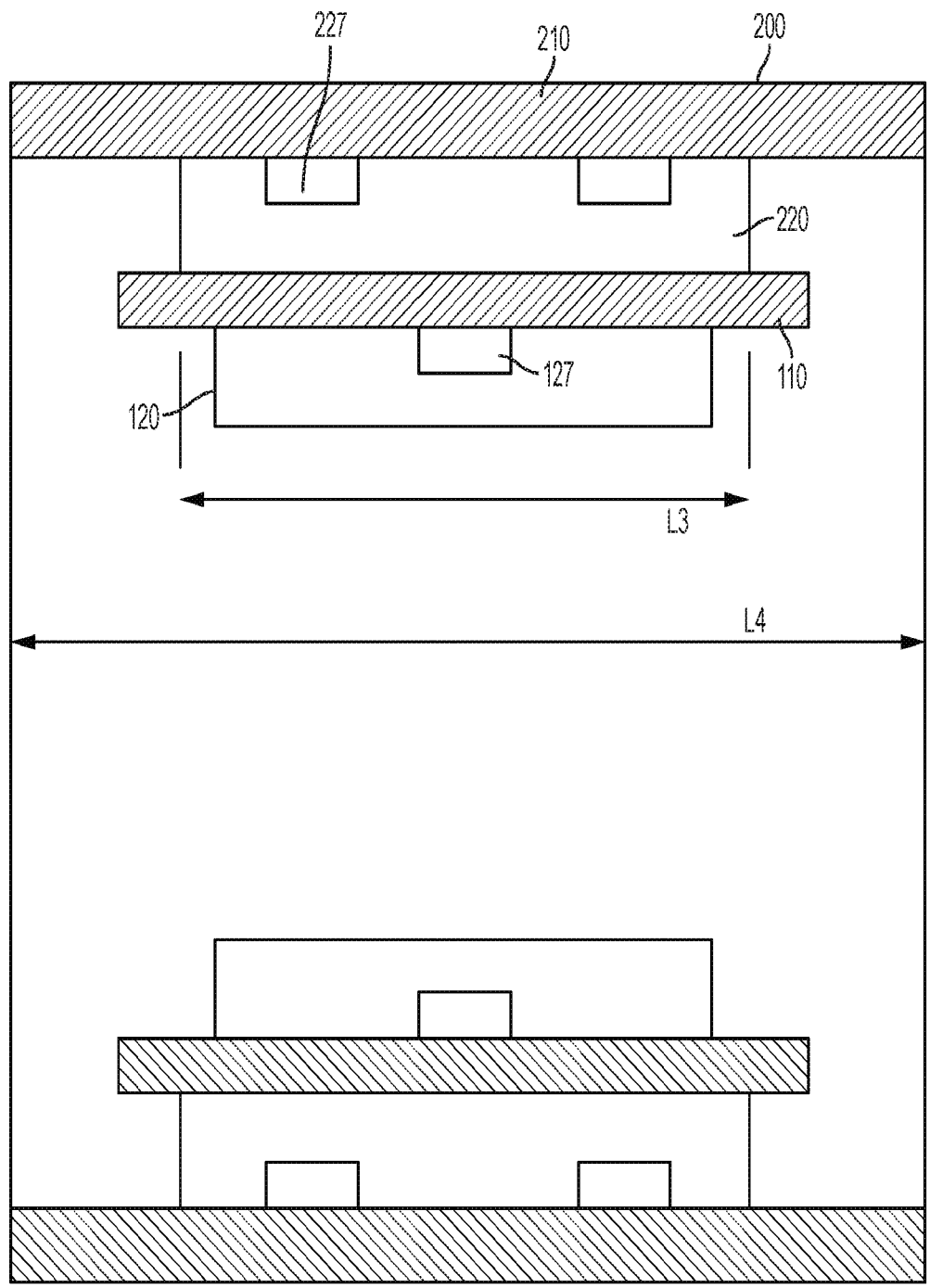
FIG. 5B is a cross-sectional schematic view taken along Line A-A of FIG. 4A.

Reference is now made to FIGS. 5A and 5B, which are a top schematic view of a TDA according to some embodiments and a cross-sectional schematic view taken along line A-A, respectively. Many of the features of an embodiment according to FIGS. 5A and 5B have been discussed above regarding FIGS. 4A and 4B. As such, the discussion thereof will be omitted for brevity. In contrast with the angular offset described in FIGS. 4A and 4B, FIGS. 5A and 5B provide that the first and second resilient member outer surface portions 123, 223 may be generally angularly aligned with one another.

Figure 6:
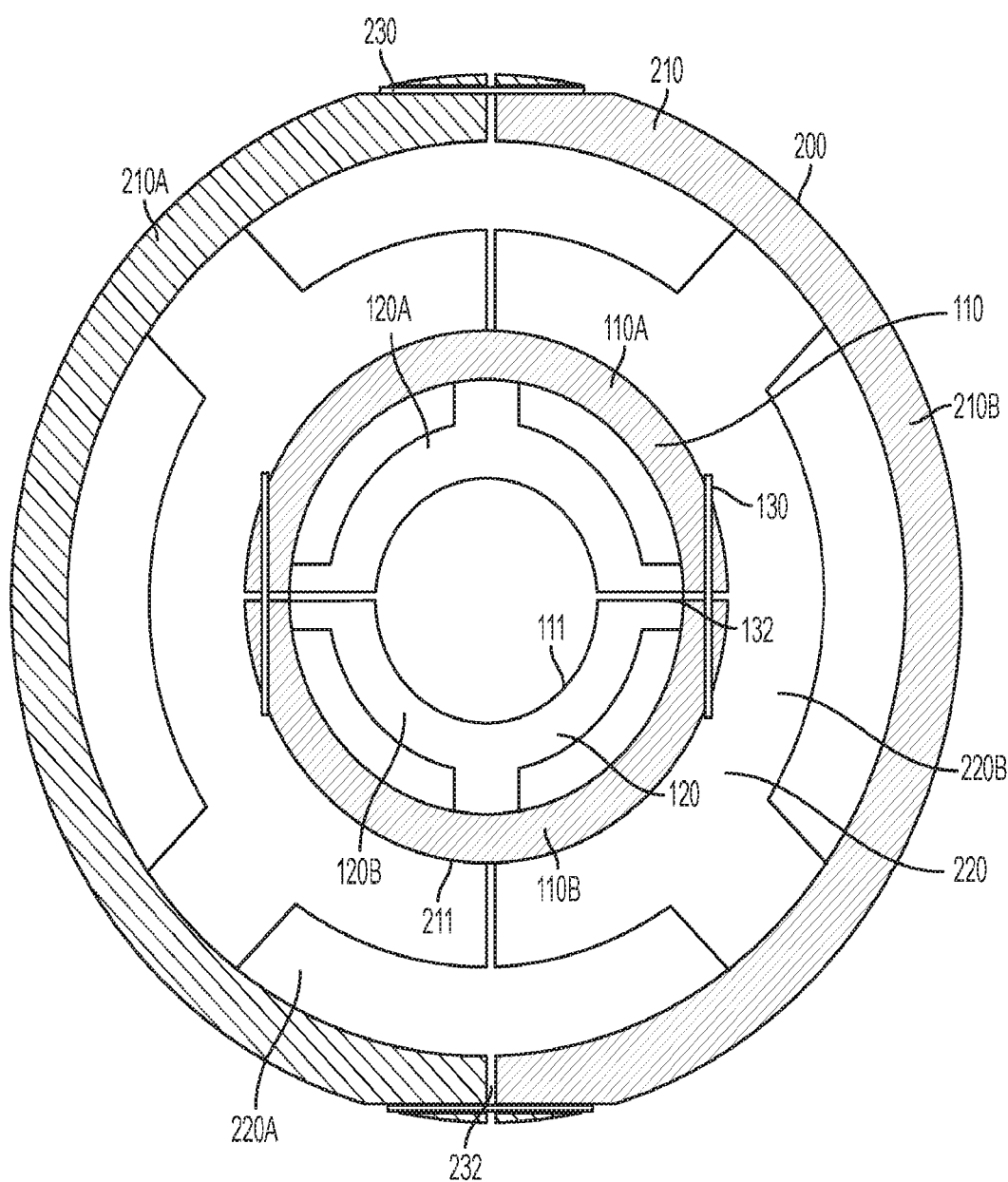
FIG. 6 is a top schematic view of a tunable dynamic vibration absorber according to some embodiments.

Brief reference is now made to FIG. 6, which is a top schematic view of a tunable dynamic vibration absorber according to some embodiments. Many of the features of an embodiment according to FIG. 6 have been discussed above regarding FIG. 4A. As such, the discussion thereof will be omitted for brevity. In one aspect of the present embodiment, the first rigid body 110 includes at least two split sleeves 110A, 110B that are configured to be coupled to one another around the steering column 22. Fastener components 130 are configured to couple the at least two split sleeves 110A, 110B to one another. In one aspect of the present embodiment, the second rigid body 210 includes at least two split sleeves 210A, 210B that are configured to be coupled to one another around the first rigid body 110. Fastener components 230 are configured to couple the at least two split sleeves 210A, 210B to one another.

The first resilient member 120 includes least two resilient member components 120A, 120B that are configured to be installed together around the steering column 22 and within the first rigid body 110. When coupled together, the at least two resilient member components 120A, 120B define the respective first resilient member inner surface 111. The second resilient member 220 includes at least two resilient member components 220A, 220B that are configured to be installed together around the first rigid body 110. When coupled together, the at least two resilient member components 220A, 220B define the second resilient member inner surface 211. Although the split between respective components may be illustrated as being angularly (e.g., orthogonally) offset from one another, such arrangement is non-limiting as the splits may be aligned. According to one aspect of an embodiment, the splits between the respective components are spaced apart by less than about 15 degrees. According to one aspect of an embodiment, the splits between the respective components are spaced apart by less than about 30 degrees. According to one aspect of an embodiment, the splits between the respective components are spaced apart by less than about 45 degrees.

Figure 7:
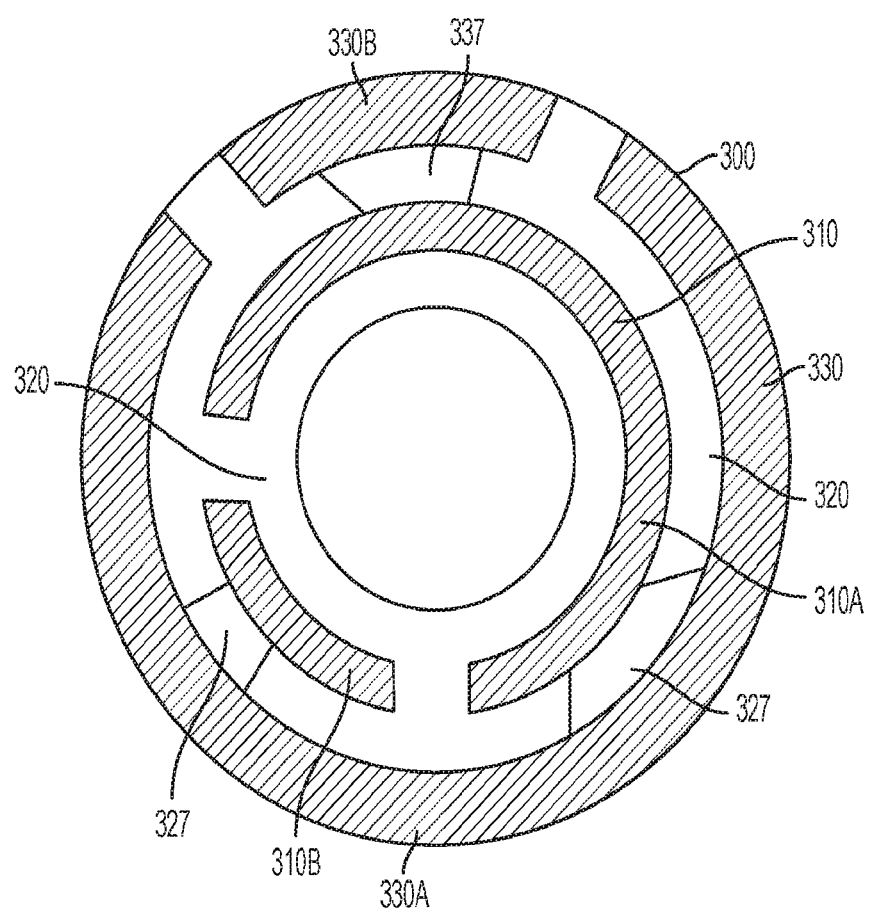
FIG. 7 is a top schematic view of a tunable dynamic vibration absorber according to some embodiments.

Reference is now made to FIG. 7, which is a top schematic view of a tunable dynamic vibration absorber according to some embodiments. In the TDA 300, an inner rigid body 310 may be supported by the resilient member 320 relative to a steering column 22. The inner rigid body 310 may include a first inner rigid body portion 310A and a second inner rigid body portion 310B that are separate from one another. As illustrated, the first and second inner rigid body portions 310A, 310B are generally illustrated as being at the same distance from the axis of the steering column 22, however, they may be positioned at different distances therefrom. The first and second inner rigid body portions 310A, 310B may include different quantities of mass relative to one another. The first and second inner rigid body portions 310A, 310B may be operable to address vibration corresponding to different frequencies from one another.

According to one aspect of an embodiment, the first and second inner rigid body portions 310A, 310B may be operable to address vibration corresponding to different directions that may correspond to the XL, XR, YL, YR, ZL and ZR degrees of freedom of movement as described above regarding FIG. 1. For example, brief reference is made to FIG. 17, which is a side view of a steering wheel and the axes of vibration that correspond to the six degrees of freedom of movement. As illustrated, the axes are selected to correspond to the general configuration of the surface compactor machine, however, such selection is arbitrary.

The TDA 300 further includes an outer rigid body 330 that includes a first outer rigid body portion 330A and a second outer rigid body portion 330B that are separate from one another. As illustrated, the first and second outer rigid body portions 330A, 330B are generally illustrated as being at the same distance from the axis of the steering column 22, however, they may be positioned at different distances therefrom. The first and second outer rigid body portions 330A, 330B may include different quantities of mass relative to one another. The first and second outer rigid body portions 330A, 330B may be operable to address vibration corresponding to different frequencies from one another. The outer rigid body 330 may be supported by the resilient member 320 relative to a steering column 22 and the inner rigid body 310. Cavities 327 may be provided to adjust the stiffness of the elastomer of the resilient member 320.

In some embodiments, the rigid body portions 310A, 310B, 330A and 330B may each correspond to different resonant frequencies. For example, the illustrated embodiments may be operable to absorb vibration at four different frequencies corresponding to the rigid body portions 310A, 310B, 330A and 330B. Although this embodiment may be operable to address four different frequencies, embodiments may include rigid bodies that are operable to address more or less than four different frequencies.

Figure 15A:
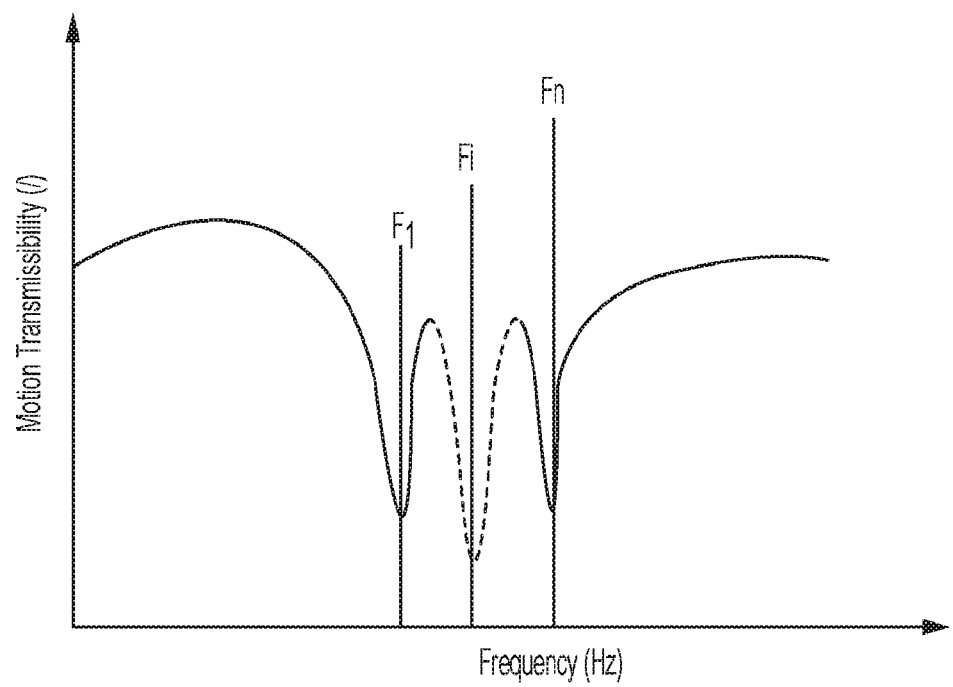
FIGS. 15A and 15B are plots of vibration amplitudes versus frequency illustrating performance of a multi-stage vibration absorber and a multiple mass, multiple resilient element tunable dynamic vibration absorber according to some embodiments, respectively.
Figure 15B:
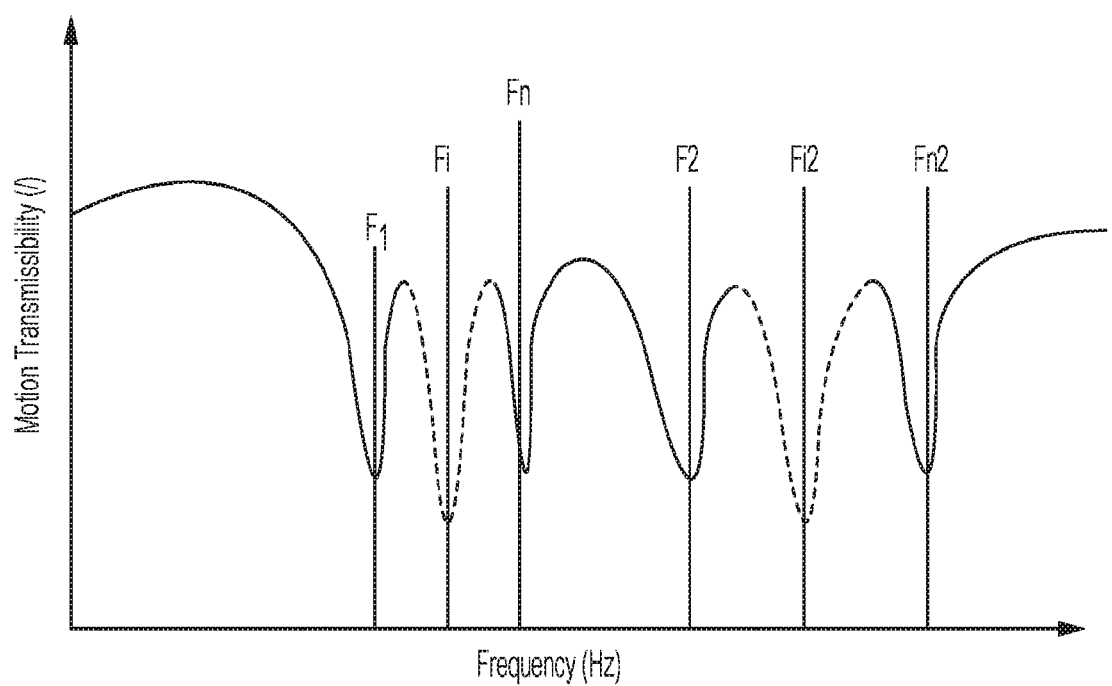

Brief reference is now made to FIGS. 15A and 15B, which are plots of vibration amplitudes versus frequency illustrating performance of a multi-stage vibration absorber and a multiple mass, multiple resilient element tunable dynamic vibration absorber according to some embodiments, respectively. As illustrated in FIG. 15A, vibration in a vibration absorber may be reduced in multiple different primary frequency bands from F1 to Fn, including intermediate frequency bands Fi. Each of these primary frequency bands may correspond to rotational speeds of one or more masses.

Referring to FIG. 15B, using a multiple mass, multiple resilient element tunable dynamic vibration absorber, vibrations in the multiple different primary frequency bands and in frequency bands corresponding to $2^{nd}$ order harmonic frequencies of the primary frequency bands can be reduced simultaneously. For example, a first frequency band F1, the intermediate frequency band Fi and the higher primary frequency band Fn may correspond to rotational speeds of multiple masses. Frequency bands F2, Fi2 and Fn2 may correspond to higher frequency harmonics of the primary frequency bands F1, Fi and Fn.

Figure 8:
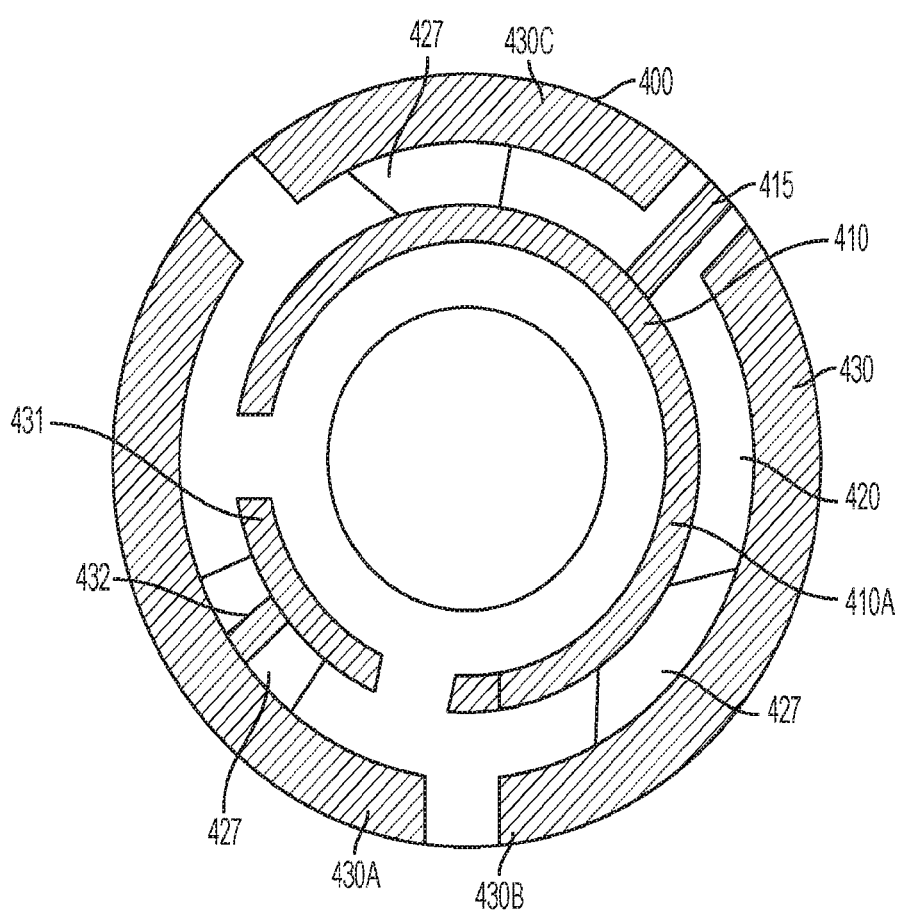
FIG. 8 is a top schematic view of a tunable dynamic vibration absorber according to some embodiments.

Reference is now made to FIG. 8, which is a top schematic view of a tunable dynamic vibration absorber according to some embodiments. In general, the spring-to-mass rate may dictate the effectiveness of a given vibration absorber design. However, for improved effectiveness, the seismic mass (e.g., rigid body) should be around 10% or greater of the base or system mass. As such, embodiments herein may include a mass-leveraging mechanism. One way to provide mass leveraging is to include a larger mass that is cantilevered to a smaller mass. When the small mass, for example, rotates about the center, the larger mass is forced to rotate with larger amplitude, effectively making it much heavier. Another way to provide mass leveraging is to divide a composite one-piece mass into pieces to form small gaps filled with resilient materials. The small gaps may confine the masses to move together when the vibrations exceed certain level. At the same time, the masses are allowed to move "separately", leading to several independent dynamic absorbers that may attenuate vibrations with different frequency components.

As illustrated, in the TDA 400, an inner rigid body 410 may be supported by the resilient member 420 relative to a steering column 22. The inner rigid body 410 may include a first inner rigid body portion 410A and a second inner rigid body portion 410B that connected to one another. The first and second inner rigid body portions 410A, 410B may be formed integrally or as separate components that are joined together. As illustrated, the first inner rigid body portion 410A may be in the shape of a partial cylinder that extends some angular distance around the axis of the steering column 22. The second inner rigid body portion 410B may extend radially from the first inner rigid body portion 410A at a given angular position on the first inner rigid body portion 410A and in a direction that is away from the axis of the steering column 22. The first and second inner rigid body portions 410A, 410B may include different quantities of mass relative to one another.

The TDA 400 further includes an outer rigid body 430 that includes a first outer rigid body portion 430A, a second outer rigid body portion 430B and a third outer rigid body portion 430C that are separate from one another. As illustrated, the first, second and third outer rigid body portions 430A, 430B, 430C are generally illustrated as being at the same distance from the axis of the steering column 22, however, they may be positioned at different distances therefrom. The first, second and third outer rigid body portions 430A, 430B, 430C may include different quantities of mass relative to one another. The first, second and third outer rigid body portions 430A, 430B, 430C may be operable to address vibration corresponding to different frequencies from one another. The outer rigid body 430 may be supported by the resilient member 420 relative to a steering column 22 and the inner rigid body 410. Cavities 427 may be provided to adjust the stiffness of the elastomer of the resilient member 420.

The outer rigid body 430 may include a fourth outer rigid body portion 431 that is at a closer radial distance from the axis of the steering column 22 than the first outer rigid body portion 410A. A cantilever portion 432 is between the first outer rigid body portion 410A and the fourth outer rigid body portion 431 and is connected to each of first outer rigid body portion 410A and the fourth outer rigid body portion 431.

Figure 9:
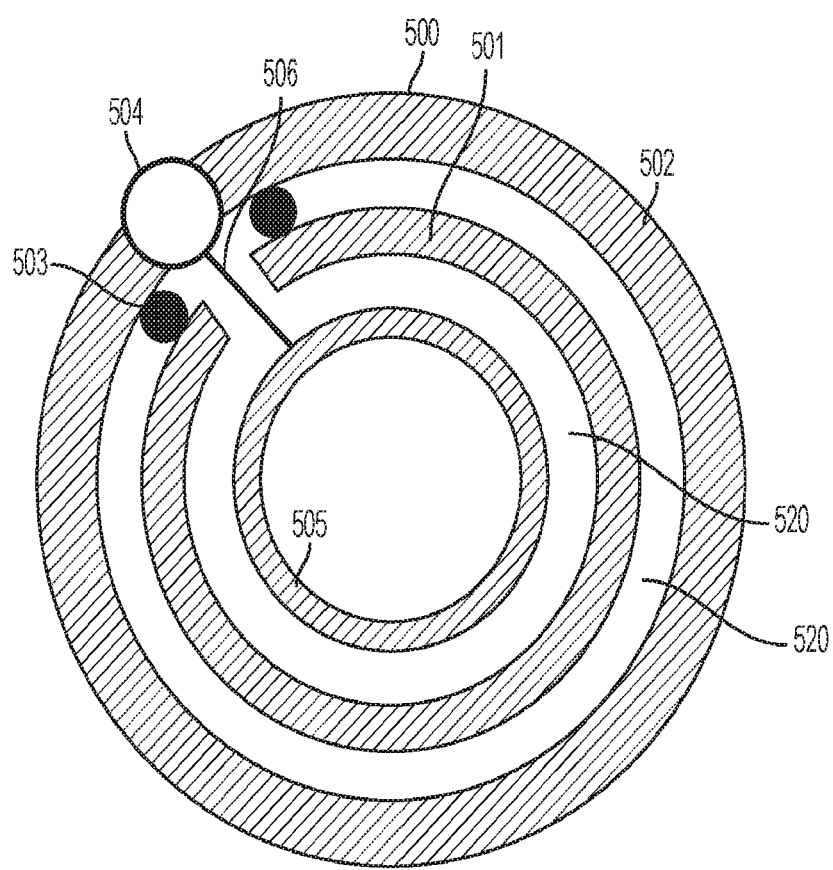
FIG. 9 is a top schematic view of a tunable dynamic vibration absorber according to some embodiments.

Reference is now made to FIG. 9, which is a top schematic view of a tunable dynamic vibration absorber according to some embodiments. A TDA 500 may include an outer rigid body 502 may include two pieces which are joined together by a pin joint 504, or the like. The outer rigid body 502 may be connected to a base 505 via a wire or bar 506 which goes through or passes through an inner rigid body 501 without contact. The outer rigid body 502 and the inner rigid body 501 may be mechanically engaged via a line support 503. The pin joint 504 and line support 503 may be closely placed. When inner rigid body 501 moves in radial direction, the outer rigid body 502 will tend to rotate about the pin joint 504.

Figure 10A:
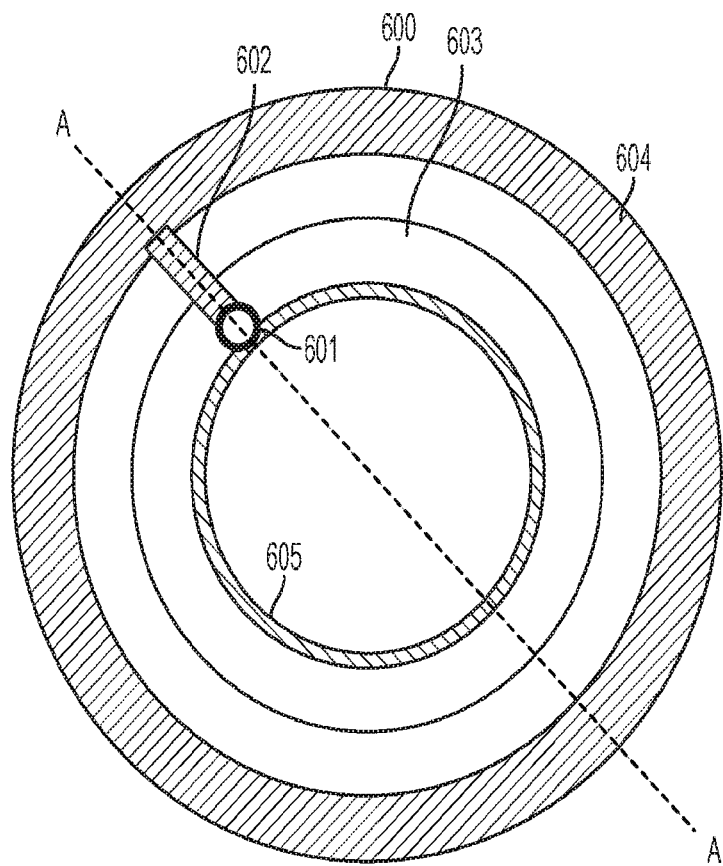
FIG. 10A is a top schematic view of a tunable dynamic vibration absorber according to some embodiments.
Figure 10B:
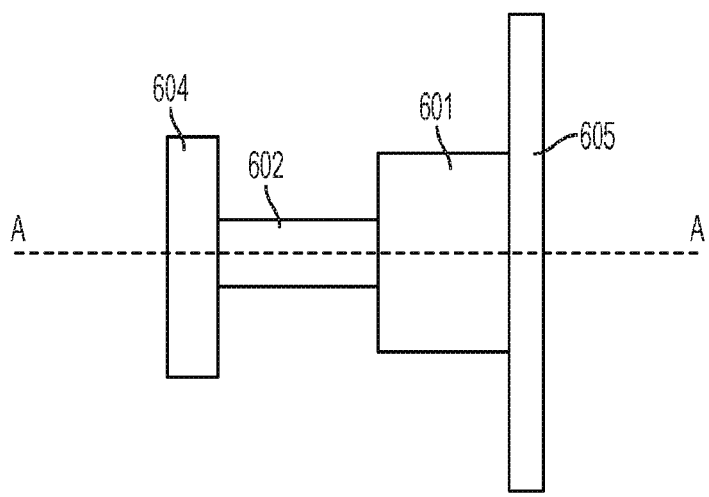
FIG. 10B is a cross-sectional schematic view taken along Line A-A of FIG. 10A.
Figure 11A:
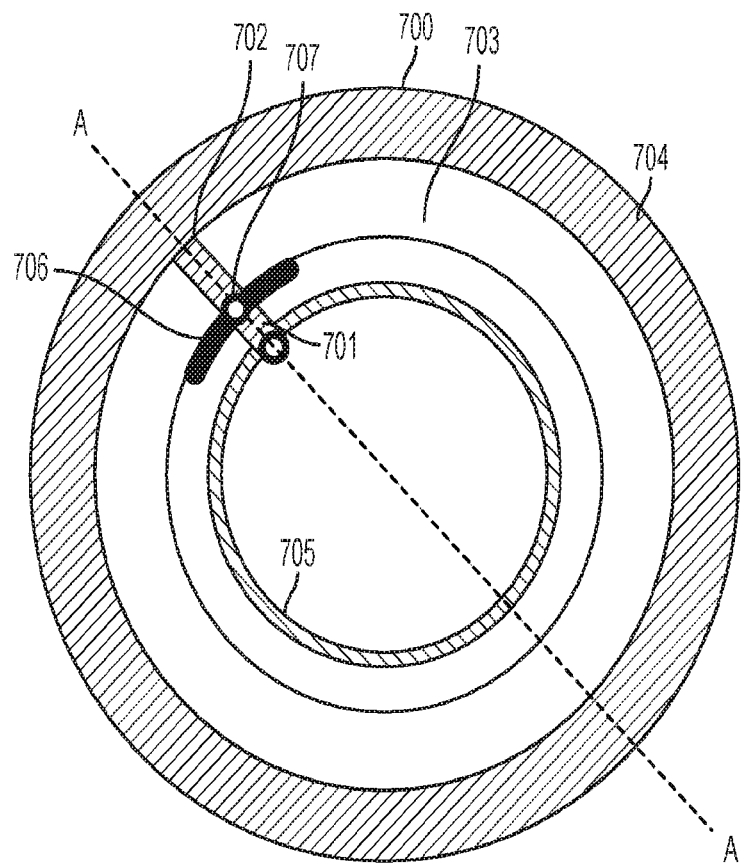
FIG. 11A is a top schematic view of a tunable dynamic vibration absorber according to some embodiments.
Figure 11B:
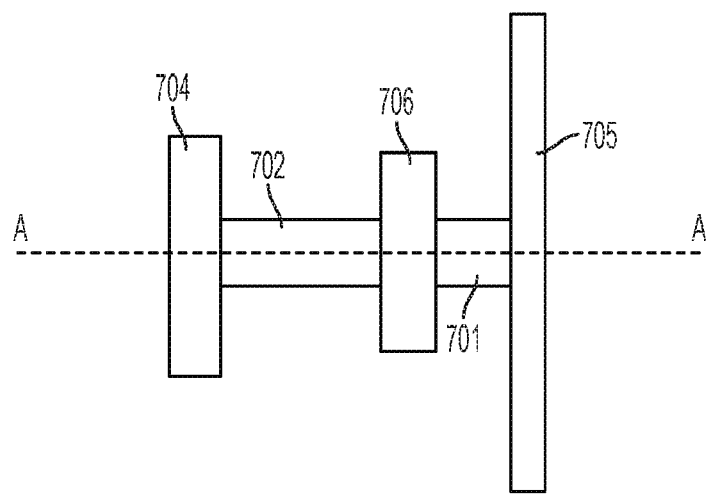
FIG. 11B is a cross-sectional schematic view taken along Line A-A of FIG. 11A.

Reference is now made to FIGS. 10A and 10B, which are a top schematic view of a TDA according to some embodiments and a cross-sectional schematic view taken along line A-A, respectively. A rigid body 604 may be cantilevered by an arm 602, which is attached to, but rotates freely about a joint 601. The arm 602 may be restrained by resilient material 603 which may be secured to the base 605.

Reference is now made to FIGS. 10A and 10B, which are a top schematic view of a TDA according to some embodiments and a cross-sectional schematic view taken along line A-A, respectively. A first rigid body 704 is cantilevered by an arm 702 that is attached to, but rotates freely about a pin joint 701. The arm 702 is also connected with a second rigid body 706 via a joining mechanism 707 that prevents them from separation, but allows them to rotate freely with respect to each other. The second rigid body 706 is attached to a base 705 via resilient material 703 that may be shaped in various ways.

Figure 16:
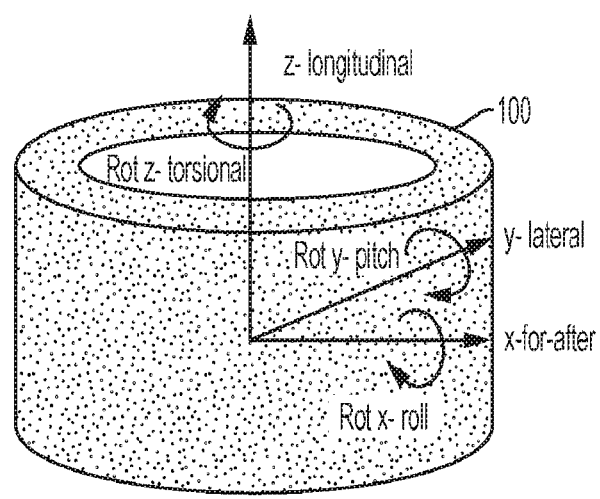
FIG. 16 is a perspective schematic view of a TDA according to some embodiments.

Reference is now made to FIG. 16, which is a perspective schematic view of a TDA according to some embodiments. As illustrated, the TDA 100 may be operable to absorb vibrations corresponding to six independent degrees of freedom of movement. For example, the six degrees of freedom include a forward aft linear direction (x), a forward aft torsional direction (roll), a longitudinal linear direction (z), a longitudinal torsional direction, a lateral linear direction (y) and a lateral torsional direction (pitch).

Some embodiments provide that the TDA 100 may be configured to absorb specific frequencies of vibration corresponding to the different degrees of freedom. For example, the TDA may be configured to absorb vibration frequency components in the forward aft (x) linear direction in a range from about 110 Hz to about 118 Hz. Some embodiments provide that the TDA 100 may be configured to absorb vibration frequency components in the forward aft torsional direction in a range from about 55 Hz to about 61 Hz. In some embodiments, the TDA 100 may be configured to absorb vibration frequency components in the longitudinal linear direction (z) in a range from about 53 Hz to about 58 Hz. Some embodiments provide that the TDA 100 may be configured to absorb vibration frequency components in the longitudinal torsional direction in a range from about 54 Hz to about 59 Hz. In some embodiments, the TDA 100 may be configured to absorb vibration frequency components in the lateral linear direction (y) in a range from about 110 Hz to about 118 Hz. Some embodiments provide that the TDA 100 may be configured to absorb vibration frequency components in the lateral torsional direction (pitch) in a range from about 55 Hz to about 61 Hz.

The vibration frequency ranges provided herein are merely example vibration frequency ranges that the TDA 100 may be configured to absorb. For example, a TDA 100 according to embodiments here may be operable to absorb vibration at frequencies that are lower and/or higher than those provided in the examples above.

Figure 17:
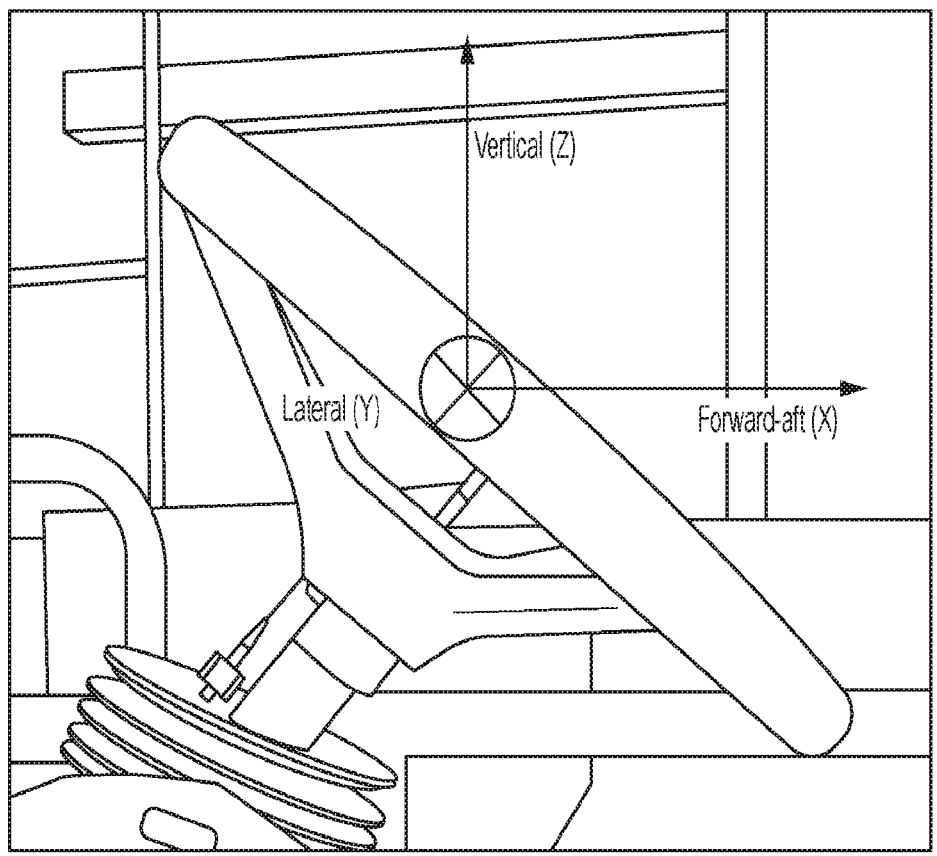
FIG. 17 is a side view of a steering wheel and corresponding vibration attenuation according to some embodiments.

Reference is now made to FIG. 17, which is a side view of a steering wheel and corresponding vibration attenuation according to some embodiments. Some embodiments provide that an effective frequency range of vibration damping in the longitudinal linear direction (Z) may be in a range from about 53 Hz to about 61 Hz and includes combined degrees of freedom components corresponding to the longitudinal linear direction (Z), the forward aft torsional direction (roll) and the lateral torsional direction (pitch).

Some embodiments provide that an effective frequency range of vibration damping in the forward aft linear direction (X) may be in a range from about 54 Hz to about 61 Hz and includes combined degrees of freedom components corresponding to the longitudinal torsional direction and the lateral torsional direction (pitch). Some embodiments provide that a $2^{nd}$ order harmonic frequency range of vibration damping in the forward aft linear direction is a range of about 110 Hz to about 118 Hz.

Some embodiments provide that an effective frequency range of vibration damping in the lateral linear direction (Y) may be in a range from about 54 Hz to about 61 Hz and includes combined degrees of freedom components corresponding to the forward aft torsional direction (roll) and the longitudinal torsional direction. Some embodiments provide that a $2^{nd}$ order harmonic frequency range of vibration damping in the lateral linear direction is in a range of about 110 Hz to about 118 Hz.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", "mounted", or variants thereof to another element, it can be directly connected, coupled, responsive, or mounted to the other element or intervening elements may be present. In contrast, when an element is referred to as being "directly connected", "directly coupled", "directly responsive", "directly mounted" or variants thereof to another element, there are no intervening elements present. Like numbers refer to like elements throughout. As used herein, the singular forms "a", "an" and "the" are intended to include the plural forms as well, unless the context clearly indicates otherwise. Well-known functions or constructions may not be described in detail for brevity and/or clarity. The term "and/or" and its abbreviation "/" include any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present disclosure. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but do not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Persons skilled in the art will recognize that certain elements of the above-described embodiments may variously be combined or eliminated to create further embodiments, and such further embodiments fall within the scope and teachings herein. It will also be apparent to those of ordinary skill in the art that the above-described embodiments may be combined in whole or in part to create additional embodiments within the scope and teachings herein. Thus, although specific embodiments are described herein for illustrative purposes, various equivalent modifications are possible within the scope of the present disclosure, as those skilled in the relevant art will recognize. Accordingly, the scope of the present disclosure is determined from the appended claims and equivalents thereof.

The invention claimed is:

1. A dynamic vibration absorber for reducing steering wheel vibration, the dynamic vibration absorber comprising:
a resilient member that includes a resilient member inner surface that defines a center cavity that is configured to receive a steering column of a vehicle that generates vibration that is transferred to a steering wheel via the steering column, the center cavity being substantially coaxial with the steering column when attached thereto, the resilient member including at least one resilient member outer surface that defines a resilient member outer diameter; and
a rigid body that engages and is supported by the resilient member and that includes at least six degrees of freedom of movement relative to the steering column, the rigid body including a rigid body inner surface that defines a rigid body center cavity that contains the resilient member,
wherein the at least six degrees of freedom comprise a forward aft linear direction, a forward aft torsional direction, a longitudinal linear direction, a longitudinal torsional direction, a lateral linear direction and a lateral torsional direction.

2. The dynamic vibration absorber of claim 1, wherein the dynamic vibration absorber is configured to absorb vibration frequency components in the forward aft linear direction in a range from about 110 Hz to about 118 Hz,
wherein the dynamic vibration absorber is configured to absorb vibration frequency components in the forward aft torsional direction in a range from about 55 Hz to about 61 Hz,
wherein the dynamic vibration absorber is configured to absorb vibration frequency components in the longitudinal linear direction in a range from about 53 Hz to about 58 Hz,
wherein the dynamic vibration absorber is configured to absorb vibration frequency components in the longitudinal torsional direction in a range from about 54 Hz to about 59 Hz,
wherein the dynamic vibration absorber is configured to absorb vibration frequency components in the lateral linear direction in a range from about 110 Hz to about 118 Hz, and
wherein the dynamic vibration absorber is configured to absorb vibration frequency components in the lateral torsional direction in a range from about 55 Hz to about 61 Hz.

3. The dynamic vibration absorber of claim 1, wherein the rigid body comprises at least two split sleeves that include fastener components that are configured to couple the at least two split sleeves to one another around the steering column.

4. The dynamic vibration absorber of claim 3, wherein the resilient member comprises at least two resilient member components that are configured to be installed together around the steering column, wherein, responsive to being installed together, the at least two resilient member components define the resilient member inner surface and the at least one resilient member outer surface.

5. The dynamic vibration absorber of claim 1, wherein a diameter of the resilient member inner surface that defines a center cavity that is configured to receive the steering column is substantially a same as an outer diameter of the steering column.

6. The dynamic vibration absorber of claim 1, wherein the at least one resilient member outside surface engages a portion of the rigid body inner surface.

7. The dynamic vibration absorber of claim 1, wherein the steering column includes a proximal end that is attached to the vehicle and a distal end that is opposite the proximal end and is configured to support the steering wheel, and
wherein the resilient member inner surface is configured to engage an outer surface of the distal end of the steering column and/or the steering wheel.

8. The dynamic vibration absorber of claim 1, wherein the resilient member comprises a first resilient member including a first resilient member inner surface that defines the center cavity that is configured to receive the steering column,
wherein the rigid body comprises a first rigid body that engages and is supported by the first resilient member,
wherein the resilient member further comprises a second resilient member that includes a second resilient member inner surface that defines a center cavity that is configured to receive the first rigid body and engage a first rigid body outer surface, and
wherein the rigid body further comprises a second rigid body that engages and is supported by the second resilient member.

9. The dynamic vibration absorber of claim 8, wherein the first rigid body and the second rigid body each include at least six degrees of freedom of movement relative to the steering column.

10. The dynamic vibration absorber of claim 8, wherein each of the first resilient member, the second resilient member, the first rigid body and the second rigid body are substantially coaxial with one another.

11. The dynamic vibration absorber of claim 8, wherein each of the first rigid body and the second rigid body comprises at least two split sleeves that include fastener components that are configured to couple the at least two split sleeves to one another around the steering column, and
wherein each of the first resilient member and the second resilient member comprises at least two resilient member components that are configured to be installed together around the steering column, wherein, responsive to being installed together, the at least two resilient member components define the respective first resilient member inner surface and second resilient member inner surface.

12. The dynamic vibration absorber of claim 8, wherein the dynamic vibration absorber is configured to absorb first vibration frequency components corresponding to the first rigid body and the first resilient member and second vibration frequency components corresponding to the second rigid body and the second resilient member.

13. The dynamic vibration absorber of claim 8, wherein the first rigid body comprises a first rigid body portion and a second rigid body portion,
wherein the first rigid body portion comprises a first quantity of mass and the second rigid body portion is separate from the first rigid body portion and comprises a second quantity of mass that is different from the first quantity of mass,
wherein the first rigid body portion and a second rigid body portion engage and are supported by the resilient member, and
wherein the first rigid body portion is configured to reduce vibration of the steering column corresponding to a first frequency and the second rigid body portion is configured to address vibration corresponding to a second frequency that is different from the first frequency.

14. The dynamic vibration absorber of claim 8, wherein the second rigid body comprises:
an outer second rigid body portion that is at a first radial distance from an axis of the steering column;
an inner second rigid body portion that is at a second radial distance from the axis of the steering column that is different from the first radial distance; and
a cantilever portion that is between the outer second rigid body portion and the inner second rigid body portion and that is connected to each of the outer second rigid body portion and the inner second rigid body portion.

15. The dynamic vibration absorber of claim 8, wherein the first rigid body comprises:
an inner first rigid body portion that is at a first radial distance from an axis of the steering column and that is formed to extend angularly around the axis of the steering column at less than 360 degrees; and
an outer first rigid body portion that extends radially from the first rigid body portion at a given angular position on the inner first rigid body portion and in a direction that is away from the axis of the steering column.

16. The dynamic vibration absorber of claim 1, wherein the rigid body comprises a cylindrical housing that includes a cavity therein that receives and engages the resilient member,
wherein the cylindrical housing comprises:
a first cylindrical housing portion that is a portion of a cylinder;
a second cylindrical housing portion, wherein a cylinder is formed when the first cylindrical housing portion and the second cylindrical housing portion are coupled together; and
a joining component that is configured to engage the first and second cylindrical housing portions to attach the first cylindrical housing portion to the second cylindrical housing portion.

17. The dynamic vibration absorber of claim 1, wherein the resilient member is selected from a plurality of resilient member types corresponding to a first tuning factor,
wherein the rigid body is selected from a plurality of rigid body types corresponding to a second tuning factor,
wherein the first tuning factor comprises at least one of a target vibration frequency, a target vibration direction, and a mass quantity of a steering column and/or a steering wheel, and
wherein the second tuning factor comprises at least one of the target vibration frequency, the target vibration direction, and the mass quantity of a steering column and/or a steering wheel.

18. The dynamic vibration absorber of claim 1, wherein an effective frequency range of vibration damping in the longitudinal linear direction is a range from about 53 Hz to about 61 Hz and includes combined degrees of freedom components corresponding to the longitudinal linear direction, the forward aft torsional direction and the lateral torsional direction.

19. The dynamic vibration absorber of claim 1, wherein a primary frequency range of vibration damping in the forward aft linear direction is a range from about 54 Hz to about 61 Hz and includes combined degrees of freedom components corresponding to the longitudinal torsional direction and the lateral torsional direction, and
   wherein a harmonic frequency range of vibration damping in the forward aft linear direction is a range of about 110 Hz to about 118 Hz.

20. The dynamic vibration absorber of claim 1, wherein a primary frequency range of vibration damping in the lateral linear direction is a range from about 54 Hz to about 61 Hz and includes combined degrees of freedom components corresponding to the forward aft torsional direction and the longitudinal torsional direction, and
   wherein a harmonic frequency range of vibration damping in the lateral linear direction is a range of about 110 Hz to about 118 Hz.

21. The dynamic vibration absorber of claim 1, wherein the resilient member outer surface that defines the resilient member outer diameter comprises a plurality of first resilient member outer surface portions that are circumferentially spaced apart from one another, and
   wherein the resilient member further comprises a plurality of second resilient member outer surface portions that are between adjacent ones of the plurality of first resilient member outer surface portions and that each define one of a plurality of cavities between adjacent ones of the plurality of first resilient member outer surface portions and the rigid body inner surface.

22. The dynamic vibration absorber of claim 21, wherein a volume of ones of the plurality of cavities is in a range of about five percent to about ten percent of a total volume of the resilient member.

23. The dynamic vibration absorber of claim 21, wherein the center cavity of the resilient member comprises a resilient member inner diameter, wherein a ratio of the resilient member outer diameter to the resilient member inner diameter is in a range of about 1.5 to about 1.6.

24. The dynamic vibration absorber of claim 21, wherein the rigid body comprises a rigid body outer diameter, wherein the center cavity of the resilient member comprises a resilient member inner diameter, and wherein a ratio of the rigid body outer diameter to the resilient member inner diameter is in a range of about 2.0 to about 2.1 times a mass ratio corresponding to the rigid body.

25. The dynamic vibration absorber of claim 21, wherein the rigid body comprises a rigid body length measured in a steering column center axis direction, wherein the resilient member comprises a resilient member length measured in the steering column axis direction, and wherein a ratio of the resilient member length to the rigid body length is in a range of about 0.85 to about 0.95.

26. The dynamic vibration absorber of claim 21, wherein the rigid body comprises a rigid body length measured in a steering column center axis direction, wherein the center cavity of the resilient member comprises a resilient member inner diameter, and wherein a ratio of the rigid body length to the resilient member inner diameter is in a range of about 1.0 to about 1.2 times a mass ratio of the rigid member.

27. The dynamic vibration absorber of claim 21, wherein ones of the plurality of first resilient member outer surface portions comprise a thickness in a direction that is measured orthogonally relative to a steering column center axis direction, wherein the center cavity of the resilient member comprises a resilient member inner diameter, and wherein a ratio of the thickness to the resilient member inner diameter is in a range of about 0.3 to about 0.35.

28. A dynamic vibration absorber for reducing steering wheel vibration, the dynamic vibration absorber comprising:
   a resilient member that includes a resilient member inner surface that defines a center cavity that is configured to receive a portion of a steering column that is adjacent the steering wheel of a vehicle, the center cavity being substantially coaxial with the steering column when attached thereto, the resilient member including at least one resilient member outer surface that defines a resilient member outer diameter; and
   a rigid body that engages and is supported by the resilient member and that includes at least six degrees of freedom of movement relative to the steering column, the rigid body including a rigid body inner surface that defines a rigid body center cavity that contains the resilient member,
   wherein the at least six degrees of freedom comprise a forward aft linear direction, a forward aft torsional direction, a longitudinal linear direction, a longitudinal torsional direction, a lateral linear direction and a lateral torsional direction.

\* \* \* \* \*